United States Patent
Keiller et al.

(10) Patent No.: US 6,226,610 B1
(45) Date of Patent: May 1, 2001

(54) DP PATTERN MATCHING WHICH DETERMINES CURRENT PATH PROPAGATION USING THE AMOUNT OF PATH OVERLAP TO THE SUBSEQUENT TIME POINT

(75) Inventors: Robert Alexander Keiller; Eli Tzirkel-Hancock; Julian Richard Seward, all of Guildford (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/246,170

(22) Filed: Feb. 8, 1999

(30) Foreign Application Priority Data

Feb. 10, 1998 (GB) .................................................. 9802838

(51) Int. Cl.[7] ............................. G10L 15/12; G10L 15/10
(52) U.S. Cl. .......................... 704/241; 704/238; 704/242; 704/255
(58) Field of Search .................................. 704/238, 241, 704/242, 255

(56) References Cited

U.S. PATENT DOCUMENTS

| | | | |
|---|---|---|---|
| 4,592,086 | | 5/1986 | Wetari et al. ........................ 704/242 |
| 5,241,619 | * | 8/1993 | Schwartz et al. ..................... 704/200 |
| 5,349,645 | * | 9/1994 | Zhao .................................... 704/243 |
| 5,621,859 | * | 4/1997 | Schwartz et al. ..................... 704/256 |
| 5,737,722 | * | 4/1998 | Kopp et al. .......................... 704/241 |
| 5,749,069 | * | 5/1998 | Komori et al. ....................... 704/240 |
| 5,805,772 | * | 9/1998 | Chou et al. .......................... 704/255 |
| 5,907,824 | | 5/1999 | Tzirkel-Hancock .................. 704/242 |
| 5,956,678 | * | 9/1999 | Haeb-Umbach et al. ............. 704/256 |

FOREIGN PATENT DOCUMENTS

| 0 392 728 | 10/1990 | (EP) | .............................. G10L/15/12 |
|---|---|---|---|
| 0 789 348 | 8/1997 | (EP) | .............................. G10L/15/12 |

OTHER PUBLICATIONS

"Continuous Speech Dictation—From Theory to Practice", by Steinbiss, et al., Speech Communication, vol. 17, No. 1, Aug. 1995, pp. 19–38.

* cited by examiner

*Primary Examiner*—Tālivaldis I. Šmits
(74) *Attorney, Agent, or Firm*—Fitzpatrick, Cella, Harper & Scinto

(57) ABSTRACT

A method and apparatus for matching a first sequence of patterns representative of a first signal with a second sequence of patterns representative of a second signal using a dynamic programming matching technique is described. The second signal patterns which are at the end of a dynamic programming path for a current first signal pattern are listed in an active list 201. The dynamic programming paths are propagated by processing the second signal patterns on the active list, and a new active list 205 is generated for the succeeding input pattern. In order to propagate each path, the system determines how many second signal patterns lie within an overlap region in which a comparison has to be made, and processes each path in dependence upon the determined amount of overlap.

153 Claims, 20 Drawing Sheets

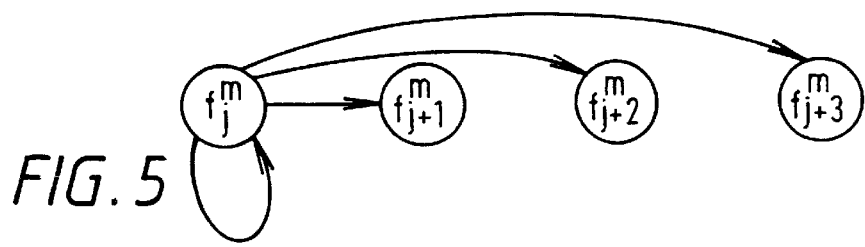
FIG. 5
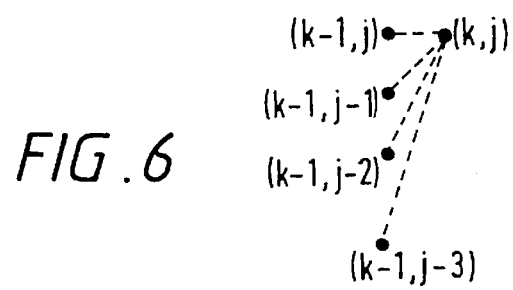
FIG. 6
FIG. 8
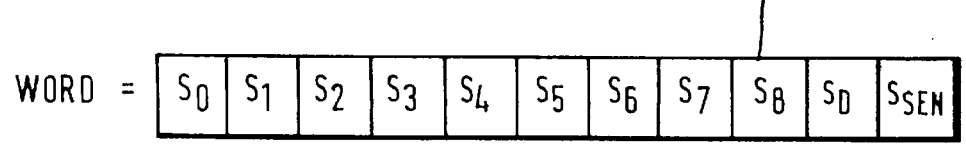
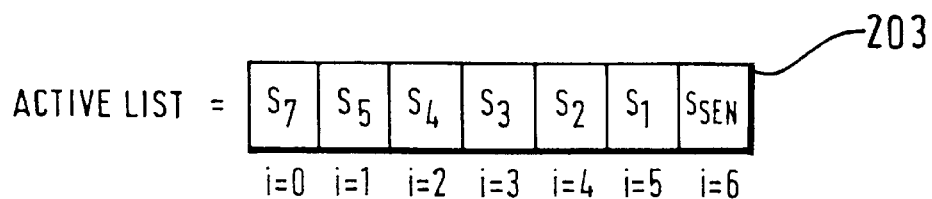
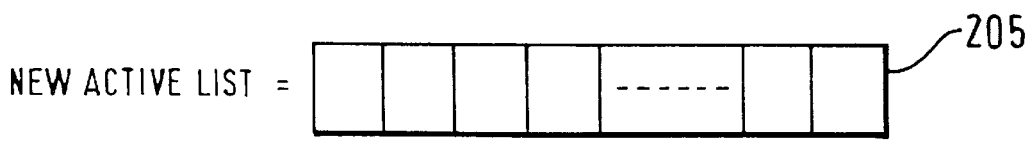

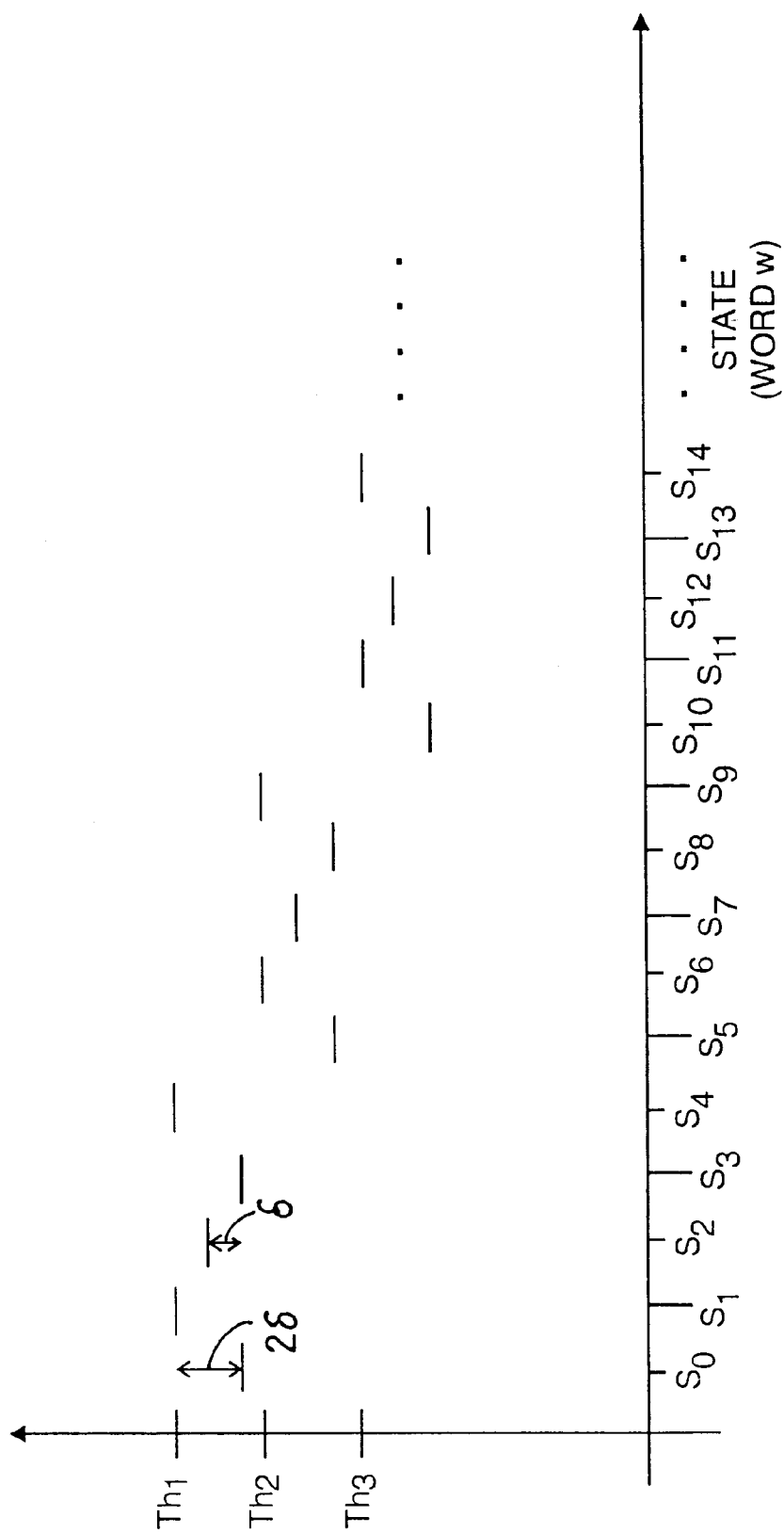

DP PATTERN MATCHING WHICH DETERMINES CURRENT PATH PROPAGATION USING THE AMOUNT OF PATH OVERLAP TO THE SUBSEQUENT TIME POINT

FILED OF THE INVENTION

The present invention relates to a method of and apparatus for pattern matching. The invention has particular, although not exclusive relevance to a method of implementing a dynamic programming matching technique. In an exemplary embodiment, the dynamic programming matching technique is employed in a speech recognition system.

BACKGROUND OF THE INVENTION

Speech recognition is a process by which an unknown speech utterance is identified. There are several different types of speech recognition systems currently available which can be categorised in several ways. For example, some systems are speaker dependent, whereas others are speaker independent. Some systems operate for a large vocabulary of words (>10,000 words) while others only operate with a limited sized vocabulary (<1000 words). Some systems can only recognise isolated words whereas others can recognise phrases comprising a series of connected words.

In a limited vocabulary system, speech recognition is performed by comparing features of an unknown utterance with features of known words which are stored in a database. The features of the known words are determined during a training session in which one or more samples of the known words are used to generate reference patterns therefor. The reference patterns may be acoustic templates of the modelled speech or statistical models, such as Hidden Markov Models.

To recognise the unknown utterance, the speech recognition apparatus extracts a pattern (or features) from the utterance and compares it against each reference pattern stored in the database. A scoring technique is used to provide a measure of how well each reference pattern, or each combination of reference patterns, matches the pattern extracted from the input utterance. The unknown utterance is then recognised as the word(s) associated with the reference pattern(s) which most closely match the unknown utterance.

Typically, the scoring is accomplished using a dynamic programming technique which provides an optimal time alignment between each of the reference patterns and the pattern extracted from the unknown utterance, by locally shrinking or expanding the time axis of one pattern until there is an optimal match between the pairs of patterns. The reference pattern or sequence of reference patterns having the best score identifies the word or words most likely to correspond to the input utterance.

The dynamic programming matching technique is relatively computationally and memory expensive as it involves the determination of many possible matchings between the incoming utterance and each reference model.

U.S. Pat. No. 4,592,086 (Nippon Electric Co. Limited) discloses a connected digit speech recognition system which uses a dynamic programming matching technique. U.S. Pat. No. 4,592,086 discloses that the amount of memory required for the matching process can be reduced if the patterns of a reference model, which are at an end of a dynamic programming path, are processed in reverse sequential order.

EP 0789348A1, subsequently issued as U.S. Pat. No. 5,907,824 discloses a system for matching a first sequence of patterns representative of a first signal with a second sequence of patterns representative of a second signal, wherein the system processes each first signal pattern in-turn by:

defining as active patterns the second signal patterns which are at the end of a path of a current first signal pattern being processed, each path representing a possible matching between an ordered sequence of second signal patterns and an ordered sequence of first signal patterns ending at the current first signal pattern;

for each active pattern, storing a cumulative value which is indicative of the closeness of the match for the path which ends at that active pattern for the current first signal pattern; and updating said cumulative values and propagating said paths based on constraints which are placed on the path propagation, by processing each active pattern in reverse sequential order;

wherein during the propagation of the path ending at the current active pattern being processed, there is an overlap with paths which have been propagated during the processing of previous active patterns, a comparison is made of cumulative values associated with the paths in the overlap region, in order that the path with the best score is propagated whilst the other paths are terminated.

However, the system described in EP 0789348A1 or U.S. Pat. No. 5,907,824 is relatively slow since it performs a check on each second signal pattern to which the path associated with the current active pattern being processed to see if it falls within the overlap region.

SUMMARY OF THE INVENTION

The present invention addresses these problems and aims to provide a more efficient system for matching sequences of patterns.

According to one aspect, the present invention provides a method of matching a first sequence of patterns representative of a first signal with a second sequence of patterns representative of a second signal, wherein the method processes each first signal pattern in-turn by:

defining as active patterns the second signal patterns which are at the end of a path for a current first signal pattern being processed, each path representing a possible matching between a sequence of second signal patterns and a sequence of first signal patterns;

for each active pattern, storing a cumulative value which is indicative of the closeness of the match for the path which ends at that active pattern for the current first signal pattern being processed; and updating said cumulative values and propagating said paths based on constraints which are placed on the path propagation, by processing each active pattern in reverse sequential order, by:

(i) determining which of the second signal patterns the path ending at the current active pattern can propagate to for the succeeding first signal pattern to be processed;

(ii) identifying how many of the second signal patterns determined in step (i) have previously been so determined during the processing of a previous active pattern; and (iii) propagating the path associated with the current active pattern in dependence upon how many of said second signal patterns are identified in said step (ii).

In performing step (ii), the method is determining how much of an overlap there is of paths propagating from the current time point to the subsequent time point and then processes the current path accordingly. This alleviates the need for performing a check on every second signal pattern to which the current path can propagate to, to see whether or not it lies within the overlap region. As a result, the amount of processing required to perform the match is significantly reduced.

Preferably, the active patterns for the current first signal pattern being processed are listed in a current active list, and wherein the second signal patterns identified in step (i) are listed, if they are not already listed, in a new active list. In this way, an identifier can be used to identify the second signal pattern which is the earliest in the sequence of the second signal patterns which are listed in the new active list after processing the preceding active pattern, and therefore, the step (ii) can identify how many of the second signal patterns determined in step (i) have previously been so determined by determining a positional relationship between the current active pattern being processed and the second signal pattern which is identified by the identifier, without having to search the new active list.

According to a second aspect, the present invention provides a method of matching a first sequence of patterns representative of a first signal with a second sequence of patterns representative of a second signal, wherein each of the patterns is represented by a plurality of parameter values, wherein the cumulative value for a path, which represents a possible matching between a sequence of second signal patterns and a sequence of first signal patterns, is updated by adding a distance measure representative of the distance between the current first signal pattern and the second signal pattern which is at the end of the current path being processed, wherein the respective parameter values of the current first signal pattern and of the second signal pattern which is at the end of the current path, address a look up table, and wherein the value stored in the addressed location of the look up table corresponds to the difference between the two parameter values.

Preferably, prior to processing the current first signal pattern, the method identifies a sub table of look up values using the parameter values of the current first signal pattern being processed, and wherein the distance measure which is to be added to the cumulative value for a path is determined by addressing the sub table of look up values with the parameter values of the second signal pattern which is at the end of that path. By generating a sub table of look up values in this way, the processing time required to determine the distance measure is reduced because a look up table is addressed directly from the parameter values of the second signal pattern which is at the end of the current path being processed.

BRIEF DESCRIPTION OF THE DRAWINGS

Various embodiments of the invention will now be described, by way of example only, with reference to the accompanying drawings in which:

FIG. 5 is a schematic representation of an allowed state transition sequence from one input frame to the next;

FIG. 6 is an alternate representation of the allowed state transition sequence shown in FIG. 5;

FIG. 8 is a schematic representation of a word model and a current active list and new active list associated therewith;

FIG. 20 is a plot illustrating a preferred variation of the pruning thresholds used for the states of each word.

DETAILED DESCRIPTION OF THE INVENTION

Embodiments of the present invention can be implemented in computer hardware, but the embodiment to be described is implemented in software which is run in conjunction with processing hardware such as a personal computer, workstation, photocopier, facsimile machine or the like.

Figure 1:
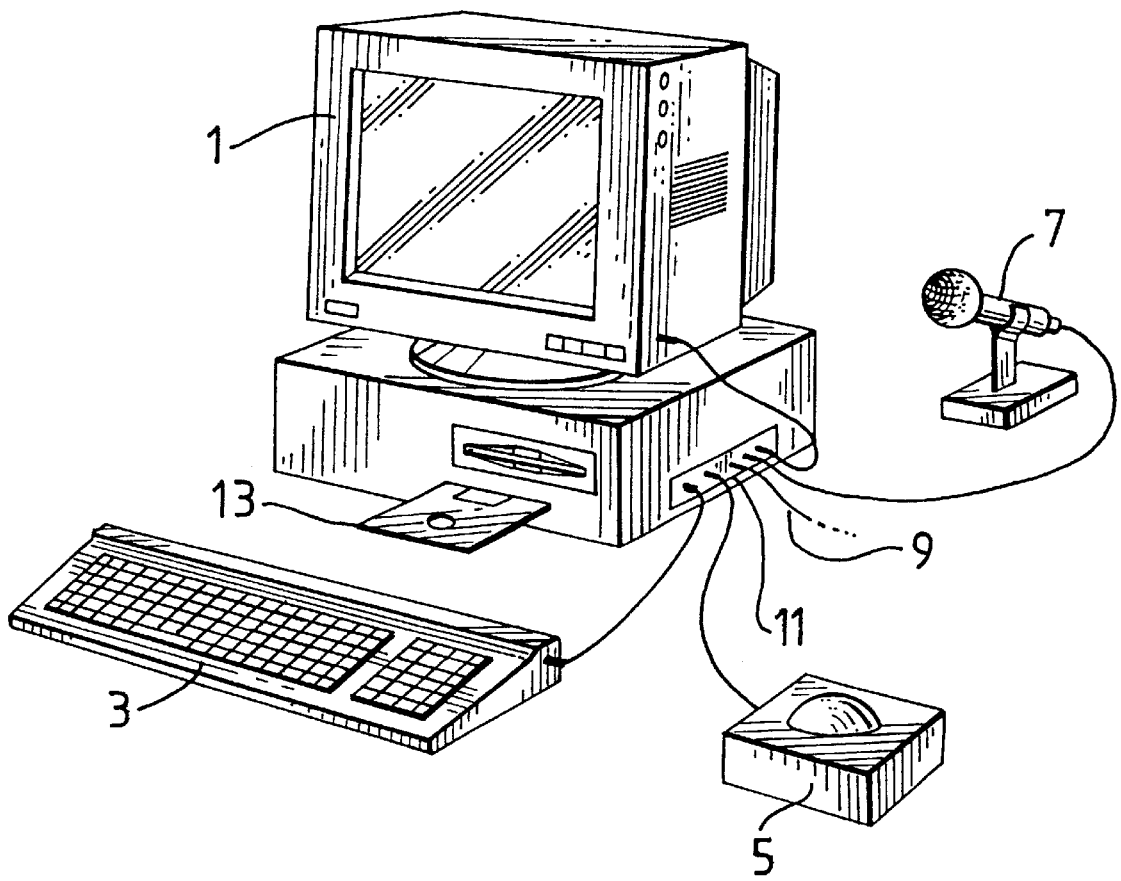
FIG. 1 is a schematic view of a computer which may be programmed to operate an embodiment of the present invention.

FIG. 1 shows a personal computer (PC) 1 which is programmed to operate an embodiment of the present invention. A keyboard 3, a pointing device 5, a microphone 7 and a telephone line 9 are connected to the PC 1 via an interface 11. The keyboard 3 and pointing device 5 enable the system to be controlled by a user. The microphone 7 converts an acoustic speech signal of the user into an equivalent electrical signal and supplies this to the PC 1 for processing. In this embodiment, the beginning and end points of the input speech to be processed, are identified by the user holding the spacebar on the keyboard 3 down for the duration of the input utterance. In this manner, the system only processes the input utterance to be identified. An internal modem and speech receiving circuit (not shown) may be connected to the telephone line 9 so that the PC 1 can communicate with, for example, a remote computer or with a remote user.

The programme instructions which make the PC 1 operate in accordance with the present invention may be supplied for use with an existing PC 1 on a storage device such as a magnetic disc 13, or by the internal modem communicating with a remote computer via the telephone line 9.

The operation of the limited vocabulary continuous speech recognition system of this embodiment will now be described with reference to FIG. 2. Electrical signals representative of input speech from, for example, the microphone 7 are input to a preprocessor 15 which converts the input speech signal into a sequence of parameter frames, each representing a corresponding time frame of the input speech signal. The parameters in each parameter frame typically include cepstral coefficients and power/energy coefficients, which provide important information characteristic of the input speech signal. The sequence of parameter frames are supplied to a recognition block 17 where the speech is recognised by comparing the input sequence of parameter frames with reference models or word models 19, each model comprising a sequence of parameter frames expressed in the same kind of parameters as those of the input speech to be recognised.

A language model 21 and a noise model 23 are also provided as inputs to the recognition block 17 to aid in the recognition process. The noise model 23 is representative of silence or background noise and, in this embodiment, comprises a single parameter frame of the same type as those of the input speech signal to be recognised. The language model 21 is used to constrain the allowed sequence of words output from the recognition block 17 so as to conform with sequences of words known to the system. The word sequence output from the recognition block 17 may then be transcribed for use in, for example, a word processing package or can be used as operator commands to initiate, stop or modify the action of the PC 1.

A more detailed description of the preprocessor 15, the buffer 16, the training of the system in order to generate the word models 19, language model 21 and the noise model 23, the updating of the language model when adding new phrases and the adaptation of the word models can be found in U.S. Pat. No. 5,907,824, the content of which is hereby incorporated by reference. A more detailed explanation will now be given of the reference models and the recognition block 17.

Reference Models

As mentioned above, in order to determine which words are represented by the output signals from the preprocessor 15, these signals are compared with stored reference models which model the words already known to the system and the acoustic environment surrounding the system. Each model associated with a particular word comprises a sequence of parameter frames of the same type of parameter frames output from the preprocessor 15 described above.

Figure 3:
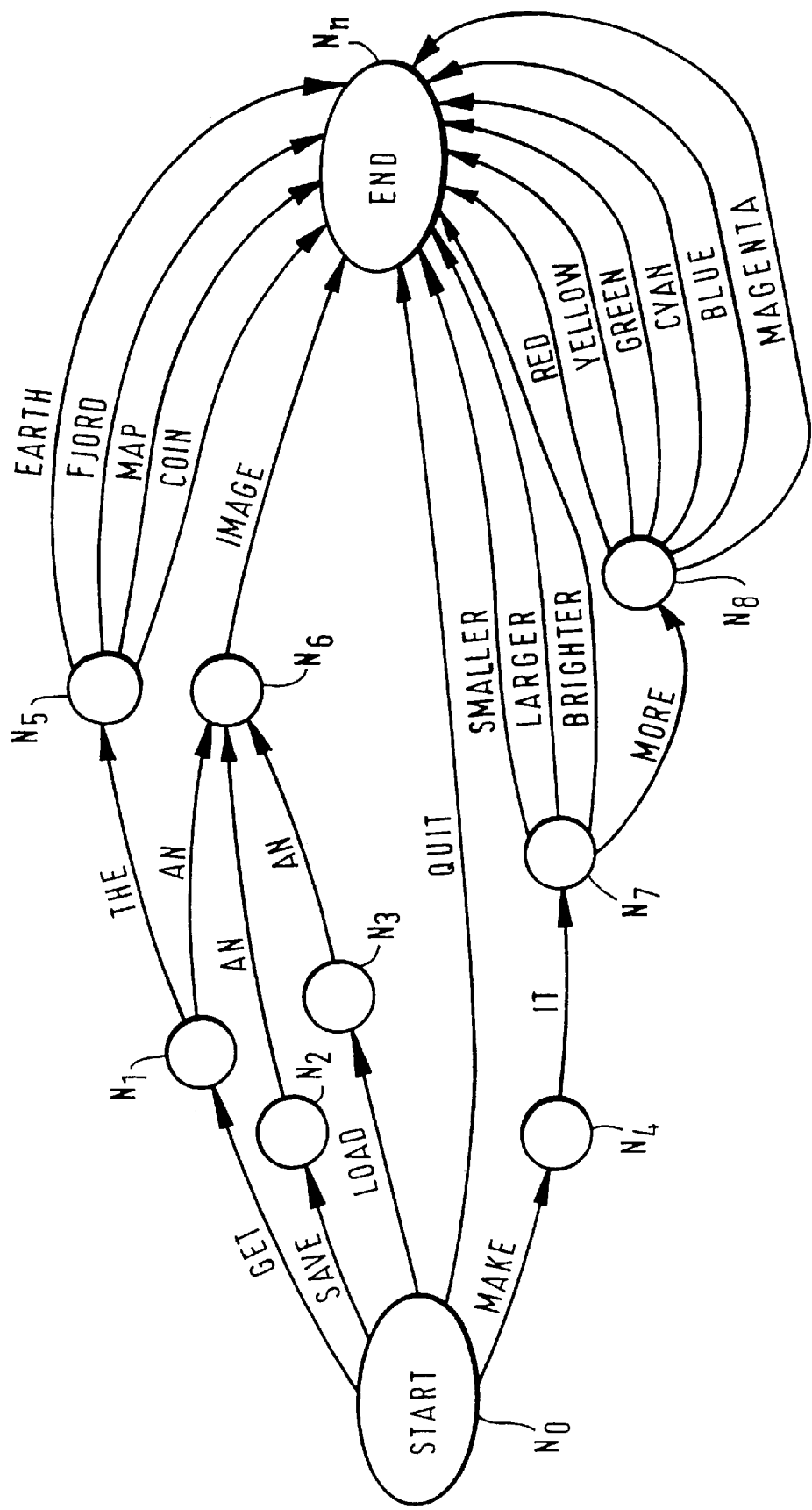
FIG. 3 is a schematic representation of a language model generated during the training process for a number of example input phrases.

In this embodiment, the language model 21 is similar to a Bigram model, and comprises a mesh of interconnected nodes, where the interconnections represent the words known to the system. It does not, however, contain any grammatical rules concerning, for example, correct English language usage. It only constrains which words can follow others based on the phrases known to it. FIG. 3 illustrates the language model 21 derived when the following phrases have been learnt by the system:

| | |
|---|---|
| get an image | phrase 1 |
| get the earth | phrase 2 |
| get the fjord | phrase 3 |
| get the map | phrase 4 |
| get the coin | phrase 5 |
| save an image | phrase 6 |
| load an image | phrase 7 |
| make it smaller | phrase 8 |
| make it larger | phrase 9 |
| make it brighter | phrase 10 |
| make it more red | phrase 11 |
| make it more yellow | phrase 12 |
| make it more green | phrase 13 |
| make it more cyan | phrase 14 |
| make it more blue | phrase 15 |
| make it more magenta | phrase 16 |
| quit | phrase 17 |

As shown in FIG. 3 there is a start node $N_0$, an end node $N_n$ and eight intermediate nodes $N_1$ to $N_8$. For an input phrase to be recognised the system must find a path from the start node $N_0$ to the end node $N_n$. The system is, however, reasonably flexible in that once trained and the user inputs the phrase "make smaller" instead of "make it smaller" the system will still interpret this input phrase as "make it smaller". The system will not, however, recognise a phrase that is input if that phrase is not known to the system even if the individual words in the phrase are known, i.e. for the language model given above, if the user says "save the image" the system will not recognise this input even though it knows the words "save", "the" and "image".

Dynamic Programming (DP)

In order to align two sequences of parameter frames in an effective manner, the alignment process must be able to compensate for the different rates at which the word is spoken, for example when the word is spoken in isolation and when the word is embedded within a continuously spoken phrase. The dynamic programming (DP) alignment process is one way which can match one word onto another in a way which applies the optimum non-linear time-scale distortion to achieve the best match at all points.

Figure 4:
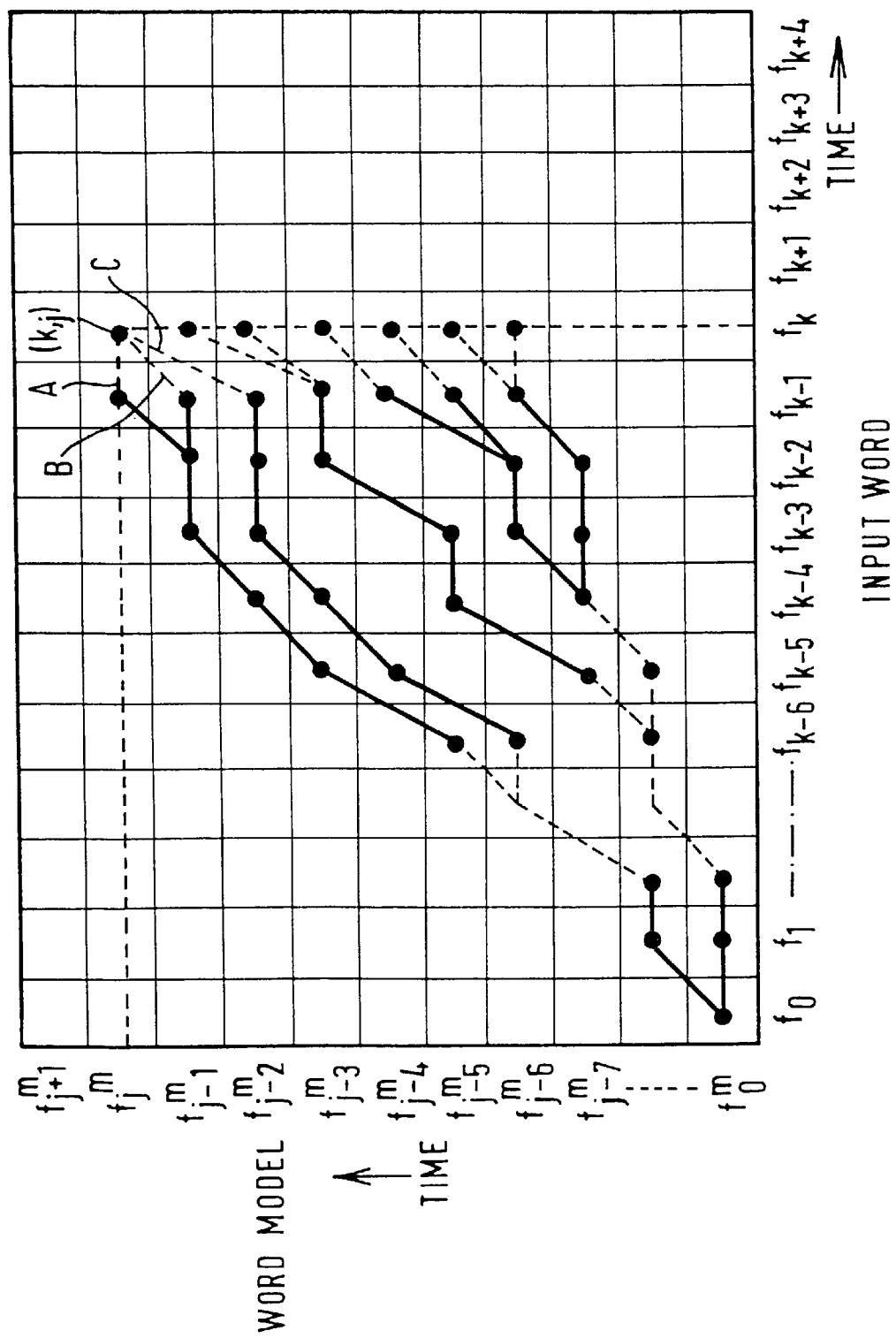
FIG. 4 is a schematic representation of the processing performed when an input word is aligned with a word model using a dynamic processing technique.

An overview of the DP matching process will now be given with reference to FIGS. 4 to 6. FIG. 4 shows along the abscissa a sequence of parameter frames representative of an input word, and along the ordinate a sequence of parameter frames representative of a word model. To find the total difference between the word model and the input word, it is necessary to find the sum of all distances between the individual pairs of frames along whichever path between the bottom left and top right corners in FIG. 4 that gives the smallest cumulative distance. This definition will ensure that corresponding frames of similar words are correctly aligned. One way of calculating this total distance is to consider all possible paths and to add the value of d(k,j) (the distance between frame k and frame j) for each point along each one. The distance measured between the two words is then taken to be the lowest value obtained for the cumulative distance. Although this method gives the correct answer, the number of valid paths becomes so large that the computation is impossible for any practical speech recognition system.

Dynamic programming is a mathematical technique which finds the cumulative distance along the optimum path without having to calculate the distance along all possible paths. The number of paths along which the cumulative distance is determined can be reduced further by placing certain constraints on the DP process. For example, it can be assumed that the optimum path will always go forward with a non-negative slope, otherwise one of the words will be a time reversed version of the other. Another constraint that can be placed on the DP process is to limit the maximum amount of time compression/expansion of the input word relative to the reference word. This constraint can be realised by limiting the number of frames that can be skipped or repeated in the matching process. For example, in FIG. 5 the frame sequence is constrained such that if frame $f_k$ is matched to frame $f_j^m$ then frame $f_{k+1}$ can be matched with frame $f_j^m$, $f_{j+1}^m$, $f_{j+2}^m$ or $f_{j+3}^m$. Therefore, if parameter frame $f_k$ of the input word and parameter frame $f_j^m$ of the word model lie on the optimum path then the above constraint necessitates that the immediately preceding point on the optimum path must be either (k−1,j), (k−1,j−1), (k−1,j−2) or (j−1,j−3), as illustrated in FIG. 6.

FIG. 4 shows the "valid paths" which are propagated up to frame $f_{k-1}$ which represent possible matchings between the input word and the word model. When frame $f_k$ is applied to the recognition unit 17 each valid path has the local distance between current frame $f_k$ and the frame of the word model that is at the end of that valid path added to its cumulative distance. If a number of valid paths meet at the same point then the valid path with the lowest cumulative distance is continued and the others are discarded. For example, in FIG. 4 paths A, B and C meet at point (k,j) and the path (A, B or C) with the lowest cumulative distance is continued whereas the other two are discarded.

Therefore, if D(k,j) is the cumulative distance along a valid path from the beginning of the word to the point (k,j), i.e.:

$$D(k, j) = \sum_{\substack{x,y=0 \\ \text{along a} \\ \text{valid path}}}^{k,j} d(x, y) \quad (1)$$

Then, with the above constraints it follows that:

$$D(k,j)=d(k,j)+\min [D(k-1,j),D(k-1,j-1), D(k-1,j-2),D(k-1,j-3)] \quad (2)$$

With the above constraints, the value of D(0,0) must equal d(0,0), d(1,0), d(2,0) or d(3,0), as all possible paths must begin at one of these points. Therefore, starting from one of the starting points, the value of D(k,j) can be determined via a recursive processing routine. When the routine reaches the end of the words to be matched, the minimum cumulative distance calculated by the DP process represents the score for the best way of matching the two words. If the input utterance to be recognised comprises a sequence of words then back-pointers must be used to indicate the direction that has been taken, so that after the DP process identifies the end of the optimum path, it is possible to recognise the input utterance by tracing back through the back-pointers.

Although the DP process described above provides a large computational saving compared with the exhaustive search of all possible paths, the remaining computation can be substantial, particularly if each incoming word has to be compared with a large number of word models for matching. Any possible saving in computation which does not significantly affect the accuracy of the recognition result is therefore desirable. One possible computational saving is to prevent paths that are scoring badly from propagating further. This is sometimes known as pruning because the growing paths are like branches of a tree. By pruning the paths in this way, only a narrow band of possible paths are considered which lie on either side of the best path. It will be appreciated that where such pruning is used it can no longer be guaranteed that the dynamic programming process will find the optimum path. However, with a pruning threshold that reduces the average amount of computation by, for example a factor of 5 to 10, the right path will almost always be obtained where the words are fairly similar.

Figure 2:
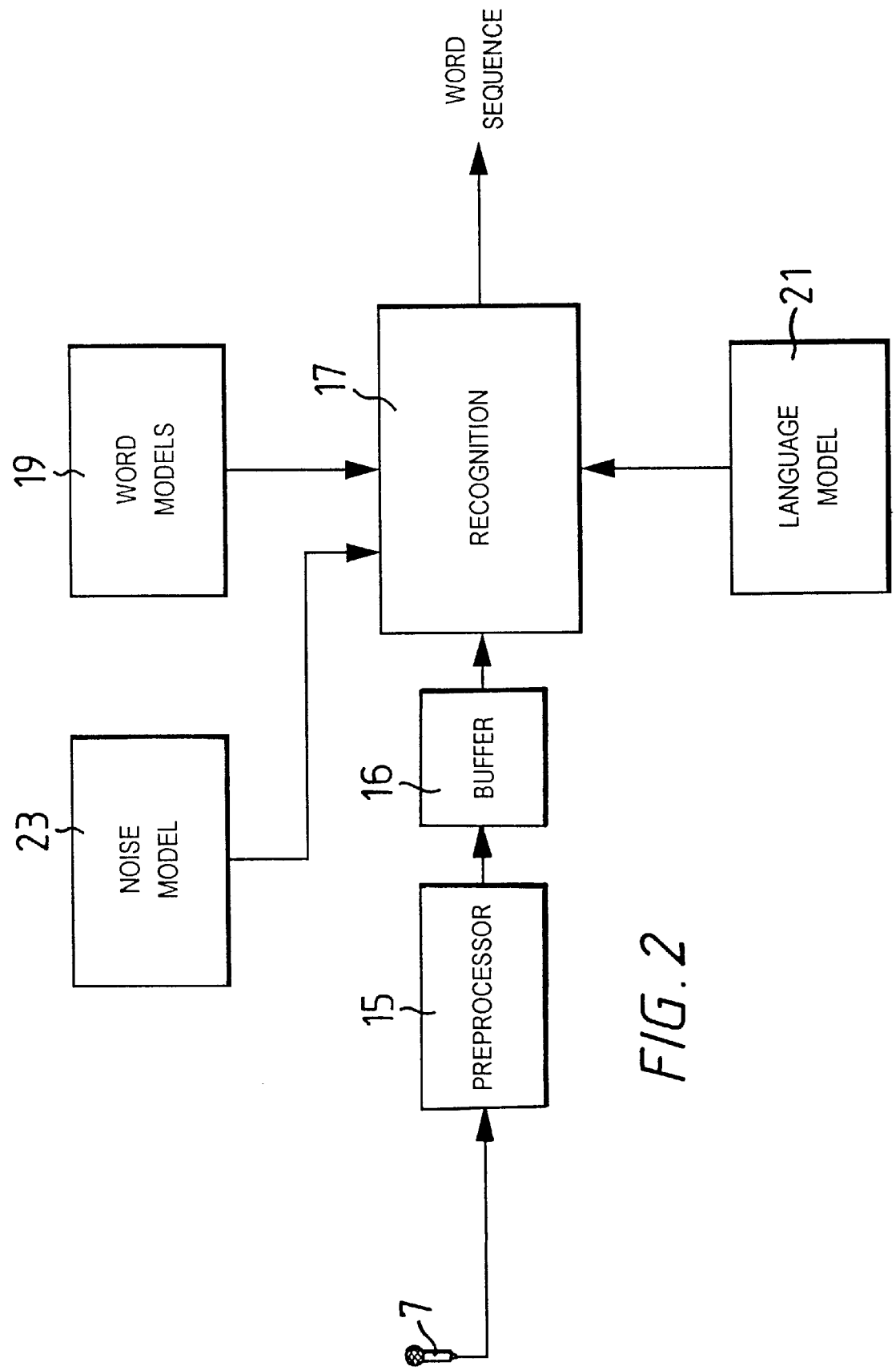
FIG. 2 is a schematic overview of a speech recognition system.

In this embodiment, the recognition block 17 shown in FIG. 2 uses a dynamic programming matching process similar to the one described above, for matching the sequence of parameter frames for the utterance to be recognised with the word models 19 and noise model 23.

Recognition Search

One feature of the speech recognition system according to this embodiment is the manner in which the dynamic programming process is implemented. In particular, this embodiment makes use of the fact that the minimum calculation performed in equation (2) above, i.e.

$$\min [D(k-1,j),D(k-1,j-1),D(k-1,j-2),D(k-2,j-3)] \quad (3)$$

does not depend upon the current frame $f_k$ being processed. Therefore, this part of equation (2) can be calculated when the previous frame $f_{k-1}$ is being processed.

The manner in which the dynamic programming process is implemented will now be explained with reference to FIGS. 7 to 17. In order to avoid confusion between the frames of the word models and the frames of the input utterance to be recognised, the frames of the word models will be referred to hereinafter as states.

Figure 7:
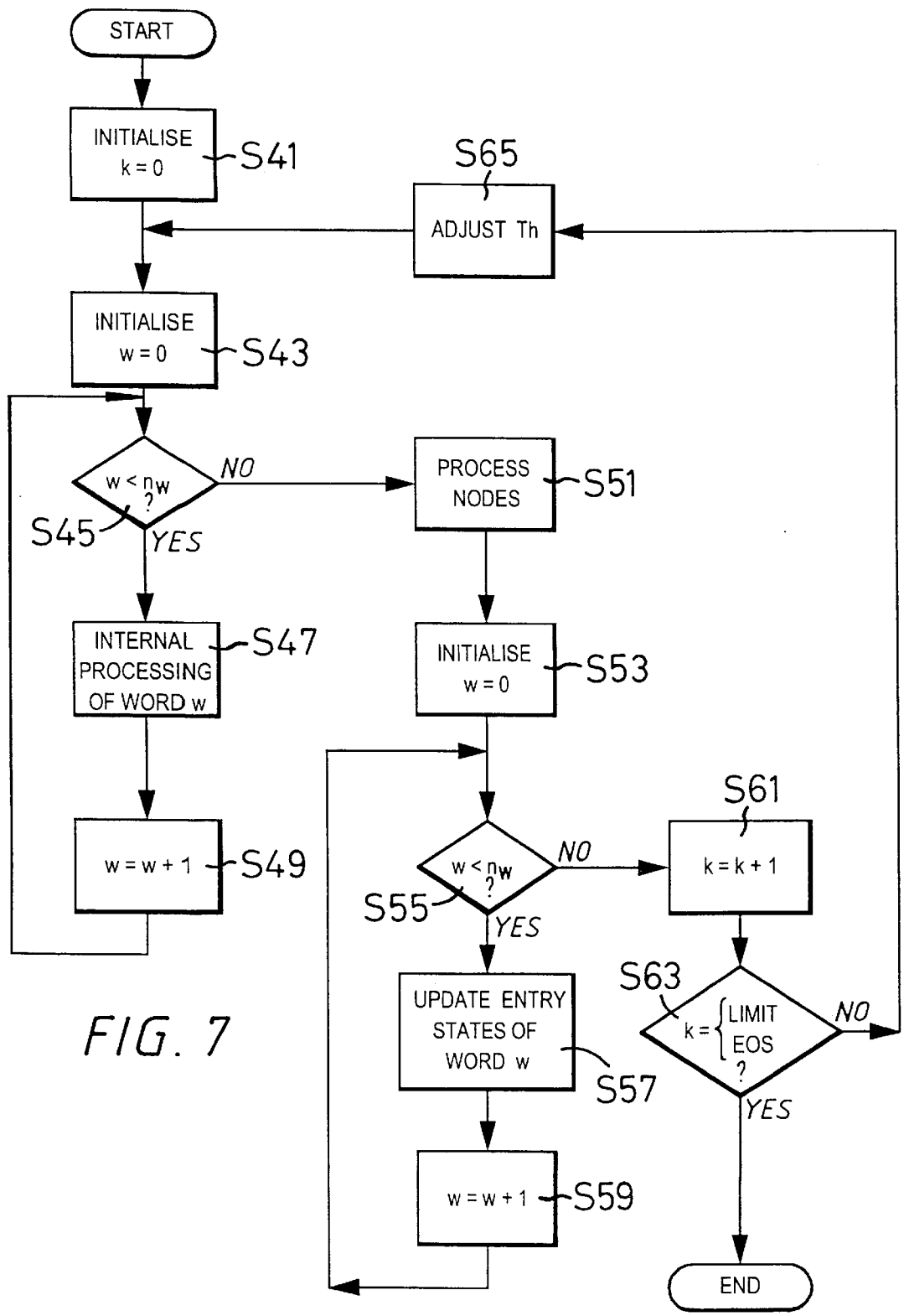
FIG. 7 is a flow chart which illustrates the implementation of the dynamic programming alignment technique used in the first embodiment.

FIG. 7 is a flow chart illustrating the processing performed in the recognition block 17 when an input utterance is to be recognised. The system processes the parameter frames of the input utterance in the sequence that they are generated by the preprocessor 15. For this purpose a frame counter variable k is provided which is initialised to zero in step S41 and is subsequently incremented after each frame is processed in step S61. Each frame being processed is used in step S47 to update the cumulative distances of the remaining valid paths within each word model. For this purpose a word counter w is provided and initialised in step S43 and incremented after step S47 in step S49. In step S45 the system checks to see if all the word models have been processed using the current frame, i.e. it checks to see whether the word counter w is less than the number of words known to the system $n_w$.

Once each word model has been processed using the current frame $f_k$ the processing passes to step S51 where the nodes of the language model 21 shown in FIG. 3 are processed using the current frame. The processing performed in step S51 takes care of the situation where the current parameter frame corresponds to silence at the beginning or end of the input speech or between allowed sequences of words in the input speech. This processing also ensures that the valid paths can only propagate through allowed sequences of words.

After the nodes have been processed in step S51, the cumulative distances for the valid paths which end at one of the beginning or "entry states" of each word model are updated in step S57. This processing is to cope with the situation where the next parameter frame $f_{k+1}$ is matched with the beginning of a word model, when the current parameter frame $f_k$ is matched with the end of another word model. To achieve this, the word counter w is re-initialised to zero in step S53, and the system checks, in step S55, whether all the word models have been processed. The system then updates, in step S57, the cumulative distances for the entry states of the current word model, and the word count w is incremented in step S59. The processing then returns to step S55.

After all the word models have been processed for the current parameter frame $f_k$, the parameter frame counter variable k is incremented in step S61. The system then determines, in step S63, whether there are any more parameter frames of the input utterance to be processed.

This is done by comparing k with the system limit (LIMIT) and the end of speech identifier (EOS) in step S63. The system limit is defined by the size of a buffer (not shown) used to store the speech samples prior to being processed by the preprocessor 15.

If all the parameter frames of the incoming utterance have been processed, then the DP process is complete and a backtracking algorithm is used to determine the optimum path, and hence the recognition result. If on the other hand, the system determines, at step S63, that there are further parameter frames to be processed, then the system adjusts the pruning threshold in step S65 and the processing returns to step S43. The pruning threshold Th is adjusted in step S65 to limit the number of valid paths that will be processed in steps S47, S51 and S57 when the next input frame is being processed.

The processing performed in step S47 of FIG. 7 will now be described in more detail with reference to FIGS. 8 to 13 for a particular example of a word model. In particular, FIG. 8 shows an example word model 201 which comprises a sequence of states $S_0$ to $S_8$ derived during a training session, an exit state $S_D$ and a sentinel state $S_{SEN}$ at the end of the word model 201. The purpose of the exit state and the sentinel state will be described later.

Each state S of the word model 201 has associated therewith a cumulative distance store D[S] which stores the cumulative distance of a valid path which ends at that state. In this embodiment, the word model 201 also has associated therewith a current active list 203 for the current frame $f_k$ which lists, in descending order, the states in the word model 201 that are at the end of a valid path for the current frame $f_k$. Therefore, each state in the current active list 203 will store the cumulative distance of the valid path that ends at that state. In this particular example, the current active list 203 for the current frame $f_k$ lists states $S_7$, $S_5$, $S_4$, $S_3$, $S_2$, $S_1$ and $S_{SEN}$. The states on the current active list 203 will be referred to as active states. In this embodiment, the word model 201 also has associated therewith a new active list 205, which is completed during the processing performed in step S47 and which lists the states in the word model 201 that will be at the end of a valid path for the next frame $f_{k+1}$.

Figure 9:
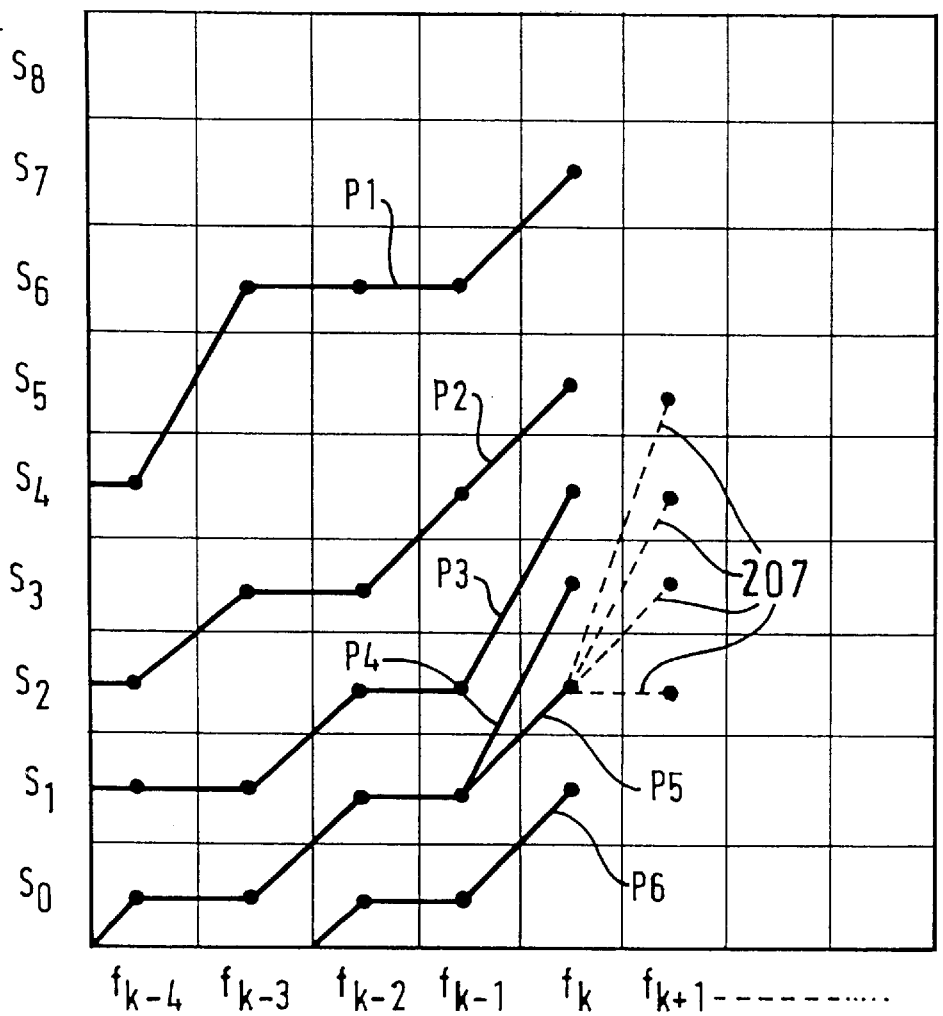
FIG. 9 is a schematic diagram which illustrates a number of example dynamic programming paths propagating within a reference model.

The significance of the current active list 203 and the new active list 205 will now be explained with reference to FIG. 9. In particular, FIG. 9 shows six valid paths p1 to P6 which represent six possible matchings between the incoming word and the word model 201 up to the current frame $f_k$. As shown, the six valid paths p1 to p6 end at word model 201 states $S_7$, $S_5$, $S_4$, $S_3$, $S_2$ and $S_1$ respectively, and it is these end states of the valid paths that are listed, in descending order, in the current active list 203 (together with the sentinel state $S_{SEN}$). To determine the states that are to be in the new active list 205, i.e. to determine the paths remaining for the next input frame $f_{k+1}$, consideration has to be given to the state transitions that are allowed from one input parameter frame to the next, i.e. the constraints placed on the dynamic programming matching process.

The maximum amount of time compression of the reference models relative to the incoming utterance is determined by the maximum number of states that can be skipped between adjacent frames of the incoming utterance. In this embodiment, this is set to two, i.e. the DP process follows the state transition diagram shown in FIG. 5. A maximum amount of time expansion of the reference models relative to the incoming utterance can be defined by allowing a maximum number of consecutive incoming frames to be matched to the same state. However, this requires a variable to count the number of repetitions and a test to see if the number of repetitions equals the maximum allowed. The inventors have found, that it proves just as effective, and takes less time, to simply penalise each repetition. Therefore, for example, with the above constraints, path p5 may propagate along one or all of the dashed paths 207 shown in FIG. 9. The other paths p1 to p4 and p6 shown in FIG. 9 will propagate in a similar manner and the states where the paths propagate to are added, in descending order, to the new active list 205. If two or more paths meet at the same point, then the path having the lowest cumulative distance is maintained and the others are discarded. Further, if the cumulative distance of a path is greater than the pruning threshold then this path will also be discarded. In this way, new paths are continuously being created whilst others are discarded. The aim of the pruning threshold is to limit the number of valid paths that are processed for each input parameter frame, thereby placing a limit on the amount of time and memory required for the algorithm.

Figure 10:
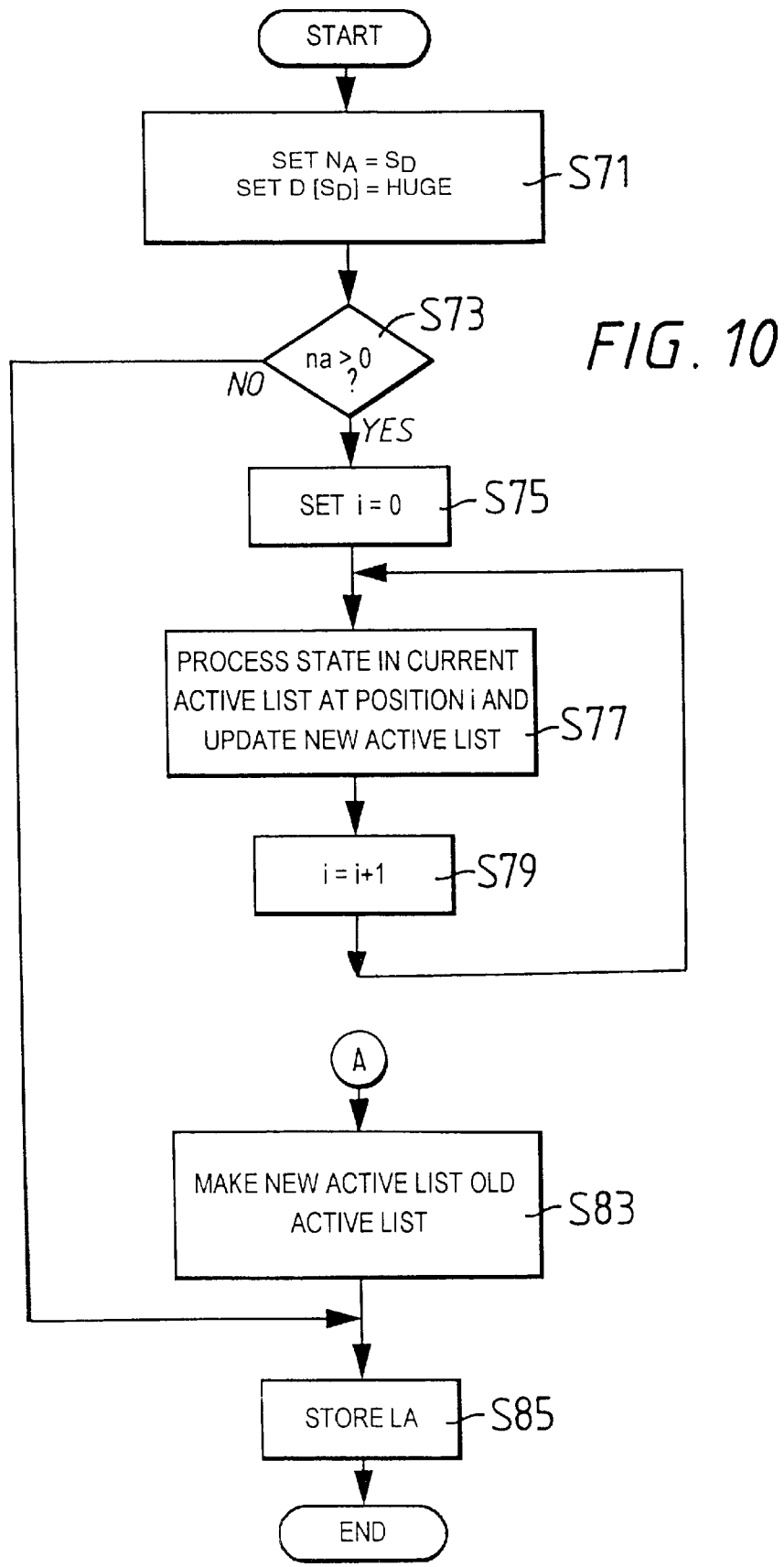
FIG. 10 is a flow chart which illustrates the steps involved in step S47 shown in FIG. 7.

FIG. 10 shows in more detail the processing steps performed in step S47 of FIG. 7. In particular, in step S71 a pointer NA is initialised and the cumulative distance stored in the exit state, i.e. $D[S_D]$, of word model 201 is set to a very large value, HUGE. The pointer NA is used to point to the state immediately preceding the last active state that has been placed in the new active list 205. As those skilled in the art will appreciate, pointer NA will, therefore, point to the state which will probably be the next state to be added to the new active list. Initially, there are no active states in the new active list 205 and so pointer NA is set to point to the exit state $S_D$. In step S73 the system checks to see if there are any active states in the current active list 203. In other words, a check is made to see if there are any valid paths ending in the current word for the current frame $f_k$. In the present example there are seven active states (including the sentinel state $S_{SEN}$) in the current active list 203 and the system processes each in turn. A count variable i is provided, which is used to count through the active states on the current active list 203, and which is set to zero in step S75 and incremented in step S79 until all the active states in the current active list 203 have been processed in step S77.

Once all the active states on the current active list 203 have been processed, the processing proceeds to step S83, where the new active list 205 generated during the processing in step S77 is changed to be the current active list 203 for the next frame $f_{k+1}$ of the input utterance to be processed. In practice this is achieved by swapping the pointers that are used to point to the two active lists. The old current active list then being overwritten during the processing of the next input frame $f_{k+1}$. Finally, in step S85 the last state that was activated and put on the new active list 205 (not including the sentinel state $S_{SEN}$), indicated by pointer LA, is stored for use in step S57 shown in FIG. 7, which will be described further below.

Figure 11:
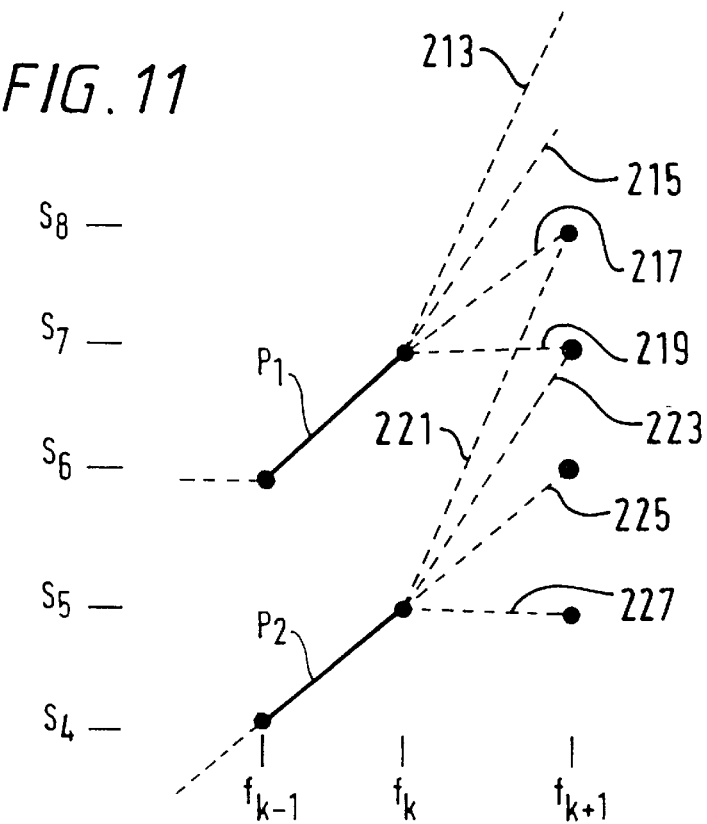
FIG. 11 is a schematic diagram which illustrates the manner in which two of the dynamic programming paths shown in FIG. 9 can propagate from the current input frame to the next.
Figure 12A:
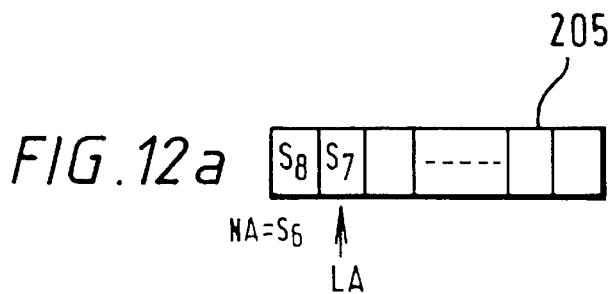
FIG. 12a is a schematic diagram illustrating the contents of the new active list shown in FIG. 8 after the first state in the current active list for the word model shown in FIG. 8 has been processed.

An overview of the processing performed in step S77 will now be given by taking as examples, active states $S_7$ and $S_5$, which are at the ends of paths p1 and p2 respectively, as shown in FIG. 9. FIG. 11 shows part of the two valid paths p1 and p2 that end at states $S_7$ and $S_5$ respectively at the current frame $f_k$. The dashed lines in FIG. 11 show the ways in which each of the two paths p1 and p2 may propagate at the next frame $f_{k+1}$. As indicated by dashed lines 213 and 215 it is possible for path p1 to extend into another word at frame $f_{k+1}$. Therefore, the cumulative distance of path p1 (which is stored in active state $S_7$) is copied into the exit state $S_D$. As indicated by dashed lines 217 and 219, path p1 can also propagate to state $S_8$ and state $S_7$ respectively. Therefore, the cumulative distance of path p1 is also copied into these states. As shown in FIG. 12a, states $S_8$ and $S_7$ are then added, in descending order, to the new active list 205 (but not the exit state which is never actually compared with the incoming frames, and is only used to store the minimum cumulative distance of all the paths that leave the word), the last active pointer LA is set to point to the last state added, i.e. state $S_7$, and the next active pointer NA is set to point to state $S_6$.

Figure 12B:
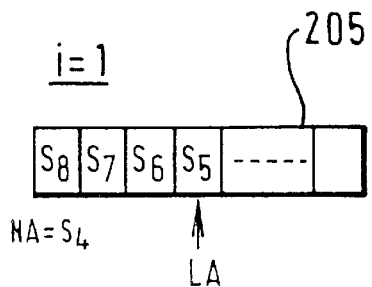
FIG. 12b is a schematic diagram illustrating the contents of the new active list shown in FIG. 8 after the second state in the current active list for the word model shown in FIG. 8 has been processed.

Once path p1 has been processed, the system then processes path p2. As indicated by dashed lines 221, 223, 225 and 227 path p2 can propagate to state $S_8$, state $S_7$, state $S_6$ and state $S_5$ respectively. However, the cumulative distance for path p2 (which is stored in active state $S_5$) is not simply copied into each of these states, since two of the states $S_8$ and $S_7$ already have a cumulative distance stored therein for the next frame $f_{k+1}$. For these two states, a comparison is made between the cumulative distance already stored therein and the cumulative distance associated with path p2, and the smallest is copied into those two states. In other words the cumulative distance stored in $S_8$ and $S_7$ for the paths shown in FIG. 11 after processing active state $S_5$ is given by $\min(D[S_7],D[S_5])$. On the other hand, the cumulative distance stored in active state $S_5$ can be copied directly into state $S_6$ since a cumulative distance for the next frame $f_{k+1}$ has not previously been stored therein. As shown in FIG. 12b, the two states $S_6$ and $S_5$ are then added to the new active list 205, the last active pointer LA is set to point to state $S_5$ and the next active pointer NA is set to point to state $S_4$. The remaining active states on the current active list 203, except for the sentinel state $S_{SEN}$, are processed in an identical manner. When the system identifies that the next state to be processed is the sentinel state, it adds the sentinel state $S_{SEN}$ to the new active list 205 and then the processing proceeds to step S83 shown in FIG. 10. The advantage of using the sentinel state $S_{SEN}$ to identify the end of the current active list will be described later. As will become apparent from the more detailed description of step S77 given below, the last active pointer LA and the next active pointer NA are provided so that the system does not have to look at the new active list 205 to identify those states which require a comparison and those that do not. In particular, if the state is beyond the state indicated by the next active pointer NA then a comparison is required, otherwise the cumulative distance can simply be copied into the state.

If S is the next active state to be processed, then, for the dynamic programming constraints applied in this embodiment, there are four different situations which need to be considered with regard to the next active pointer. In particular, (i) the situation where the next active pointer NA points to state S;
(ii) the situation where the next active pointer NA points to a state beyond state S+2;
(iii) the situation where the next active pointer NA points to state S+1; and
(iv) the situation where the next active pointer NA points to state S+2.

The inventors have established that the first of the above situations is the most probable to occur, that the second of the above situations is the second most probable to occur and that the other two situations are very rare. The search algorithm, has therefore been designed to consider these situations in this order, so that the least likely situations are only considered if the most likely situations are false, thus speeding up the search algorithm.

The inventors have also established that, for the dynamic programming constraints of the present embodiment, if S is the current active state being processed, then the following can be guaranteed:

$$D[S+1] \geq D[S+2] \geq D[S+3] \qquad (4)$$

From this it follows that if the cumulative distance stored in the current active state, i.e. D[S], is greater than D[S+1], then it is not necessary to compare D[S] with D[S+2] and D[S+3]. Similarly, if D[S] is less than D[S+1], but greater than D[S+2], then it is not necessary to compare D[S] with D[S+3]. However, care has to be taken if the current active State S is less than three states from the end of the word, since State S+3 does not exist. An explicit test for this case can be avoided by using the sentinel state $S_{SEN}$ at the end of the word. In particular, by setting the cumulative distance stored in the sentinel state $S_{SEN}$ to equal zero, this guarantees that D[S] cannot be lower than $D[S_{SEN}]$. Therefore, by using the sentinel state and the rules mentioned above, the algorithm never tries to propagate beyond the sentinel state.

The processing of each state performed in step S77 shown in FIG. 10 will now be described in more detail with reference to FIGS. 13a to 13e. In step S91 of FIG. 13a the system compares the cumulative distance for the valid path ending at the current active state S with the pruning threshold Th, i.e. D[S] is compared with Th. If D[S] is greater than the pruning threshold Th, then the path ending at the current active state is discarded and the processing returns to step S79 shown in FIG. 10. If D[S] is less than the pruning threshold Th, then the processing proceeds to step S92 where the system checks to see if D[S] is equal to zero, i.e. to check whether or not the current active state S being processed is the sentinel state $S_{SEN}$.

In this embodiment, the sentinel state is added to the end of the active list so that step S92 will identify when there are no more active states on the current active list to be processed. Alternatively, a specific test can be performed after processing each active state to see if that state is the last on the current active list. However, the advantage of using the sentinel state in this manner, is that no test will be performed for those states that are pruned out in step S91, thereby saving in processing requirements.

If the current state is not the sentinel state, then the processing proceeds to step S93 where the variable ACOUNT, which is used to keep count of the total number of active states processed for the current frame $f_k$, is incremented. The system then calculates, in step S94, the local distance between the current active state S being processed and the current frame $f_k$ being processed and adds this to the cumulative distance D[S] stored in the current active state.

In this embodiment, the following sum of magnitudes is used to derive a measure of the local distance between the current frame $f_k$ and the current active state S:

$$d(S, f_k) = \sum_{p=1}^{m} |S^p - f_k^p| \qquad (5)$$

where m is the number of parameters in each frame/state which are extracted from the input speech by the preprocessor 15. Other distance measures can be used, such as an Euclidean distance measure, however, the above sum of magnitudes is preferred since multiplications are not required and the distance calculation can be performed with additions and subtractions only.

As those skilled in the art will appreciate, the calculation of distances is one of the major components of the recognition search in terms of CPU requirement.

In a low cost application, such as in a personal organiser, where memory requirements and processing power are limited and where each of the parameters of the states and of the incoming frames are stored as a single byte, the above distance calculation can be implemented using a look up table since the difference $S^p - f^p_k$ can take only one of 511 different values. Using a look up table in this manner, avoids the necessity to determine whether the difference $S^p - fp^p_k$ is positive or negative. The distance calculation therefore becomes:

$$d(S, f_k) = \sum_{p=1}^{m} LUT[256 + S^p - f^p_k] \qquad (6)$$

As those skilled in the art will appreciate, 256 has been included in the look up table (LUT) addressing, so that the table entries do not run between minus 255 and positive 255, but instead run from 1 to 511.

Where a look up table is used in the distance calculation, a fast implementation can be obtained by noting that the same input frame $f_k$ is compared against a large number of word states S. Therefore, for each frame $f_K$, a table pointer TP can be calculated such that $TP^p$ is the address of table element $[256 - f^p_K]$. Therefore, the calculation of the distance becomes:

$$d(S, f_k) = \sum_{p=1}^{m} TP^p[S^p] \qquad (7)$$

After the cumulative distance D[S] has been updated in step S94, the system checks for the above mentioned four situations in steps S95 to S97. In particular, in step 95, the system checks to see if the valid path which ends at the current active state S is the state pointed to by the next active pointer NA. If it is, then the processing proceeds to step S98 shown, in FIG. 13b. If the next active pointer NA does not point to the current active state S, then the processing proceeds to step S96, where the system checks to see if the next active pointer NA points to a state which is more than two states beyond the current active states being processed. If it is, then the processing passes to step S109 shown in more detail in FIG. 13c, whereas if it is not, then the processing passes to step S97, where the system checks to see if the next active pointer NA is pointing to the state which succeeds the current active state. If it is, then the processing proceeds to step S115 shown in FIG. 13d, whereas if it is not, then this means that the next active pointer NA must be pointing to state S+2 and the processing proceeds to step S125 shown in FIG. 13e.

A description will now be given of the processing steps performed in FIGS. 13b to 13e. FIG. 13b illustrates the processing steps which are performed in the situation that the next active pointer NA points to the current active state S being processed. As will be apparent to those skilled in the art, with the dynamic programming constraints mentioned above, in this situation, the cumulative distance for the valid path ending at the current active state S must be compared with the cumulative distance stored in the three states S+1, S+2 and S+3 which succeed the current active state S since these states are already on the new active list.

Prior to performing this comparison, however, the system adds, in step S98, the current active state S to the next position in the new active list 205. The system then sets, in step S99, the next active pointer NA to point to state S−1.

The processing then proceeds to step S100 where the system checks to see whether the cumulative distance stored in the current active state S is less than the cumulative distance stored in state S+1. If it is not, then because of equation (4), it is not necessary to compare the cumulative distance stored in the current active state S with the cumulative distance stored in states S+2 or S+3 and the processing can proceed to step S108. If the cumulative distance stored in the current active state S is less than the cumulative distance stored in state S+1, then the processing proceeds to step S101 where the cumulative distance stored in state S+1 is made equal to the cumulative distance stored in the current active state S. In other words, the path ending at the current active state is propagated to state S+1. The system then checks, in step S102, to see if the cumulative distance stored in the current active state S is less than the cumulative distance stored in state S+2. If it is not, then again the processing passes to step S108, whereas if it is then the processing passes to step S103, where the cumulative distance stored in state S+2 is made equal to the cumulative distance stored in the current active state S. The processing then proceeds to step S104 where the system checks to see if the cumulative distance stored in the current active state S is less than the cumulative distance stored in state S+3. If it is not, then again the processing passes to step S108, whereas if it is, then the processing proceeds to step S105 where the cumulative distance stored in state S+3 is made equal to the cumulative distance stored in the current active state S.

If the cumulative distance stored in the current active state has been copied into all three of the succeeding states, then the system checks, in step S106, whether the cumulative distance stored in the current active state S is less than the minimum cumulative distance (MINSCORE) for all of the valid paths in all of the words, that have been processed up to the current frame $f_k$. If it is not, then the processing passes to step S108, whereas if it is, then MINSCORE is replaced by the cumulative distance stored in the current active state S in step S107. The processing then proceeds to step S108 where a penalty (PEN) is added to the cumulative distance stored in the current active state S. As mentioned above, the penalty is added in order to prevent excessive time expansion of the reference models. The processing then ends and returns to step S79 shown in FIG. 10, where the state counter i is incremented so that the next state on the current active list is processed in step S77.

Figure 13A:
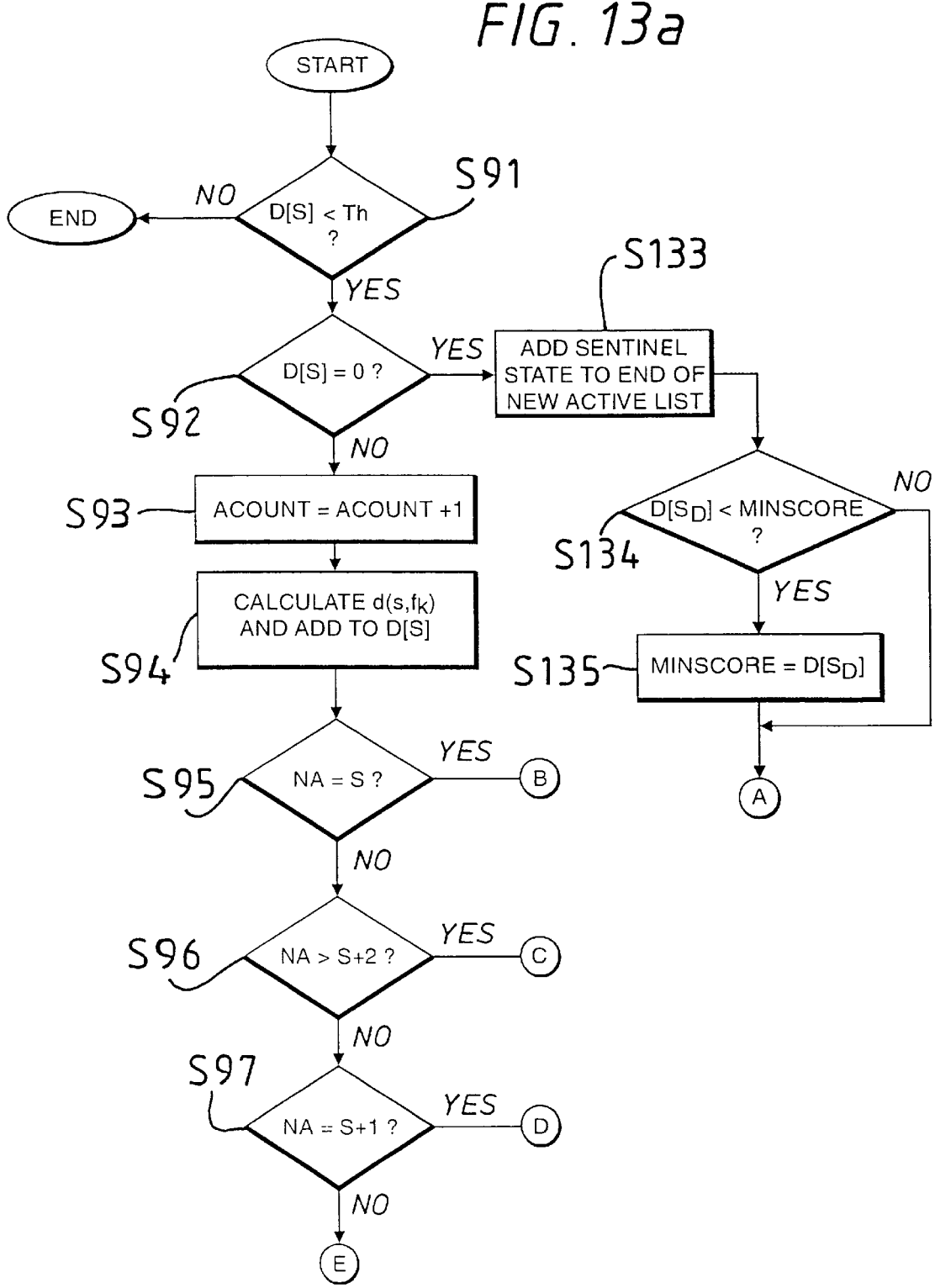
FIGS. 13a to 13e are flow charts which illustrate the processing performed in step S77 shown in FIG. 10.
Figure 13B:
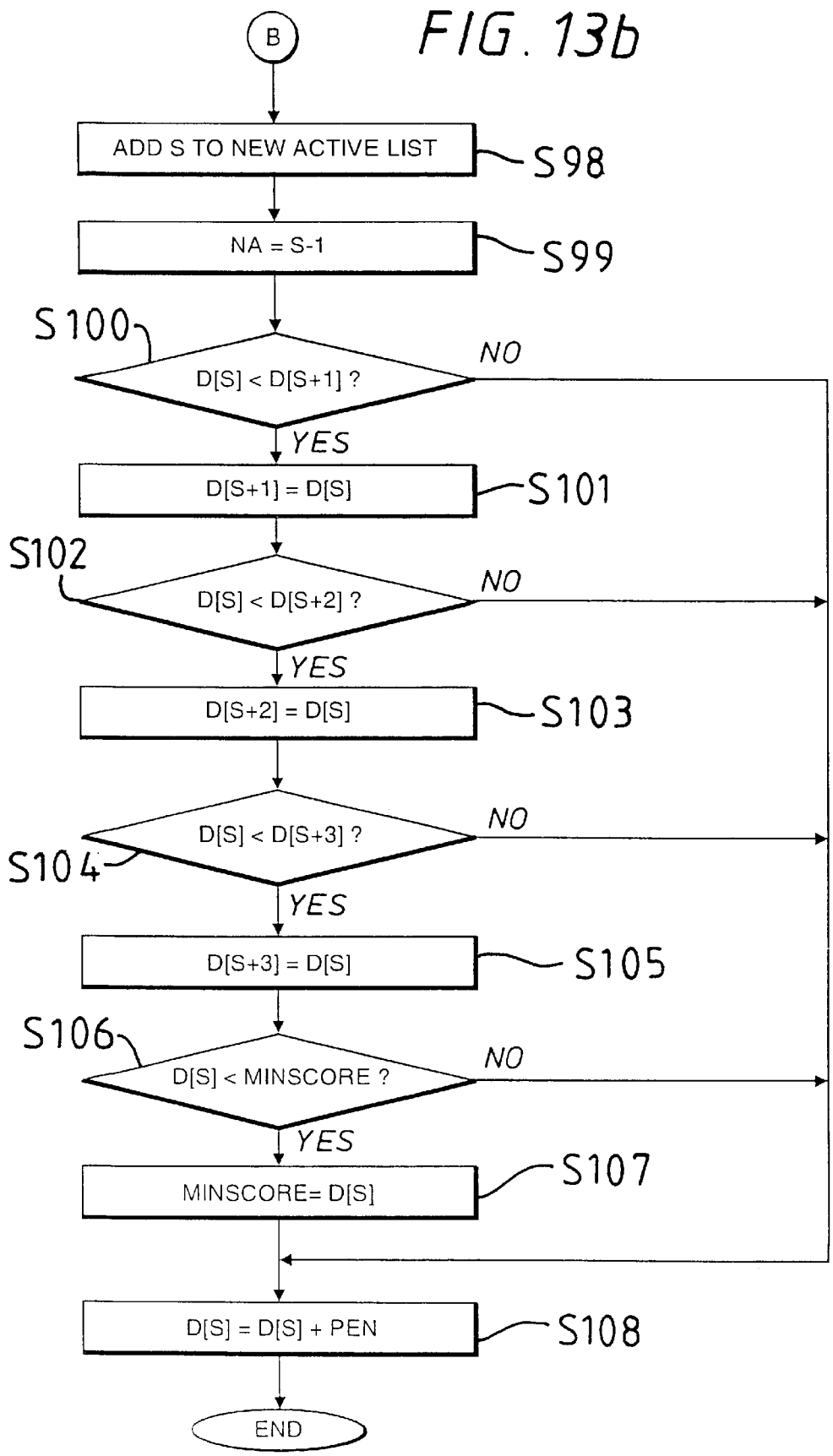
Figure 13C:
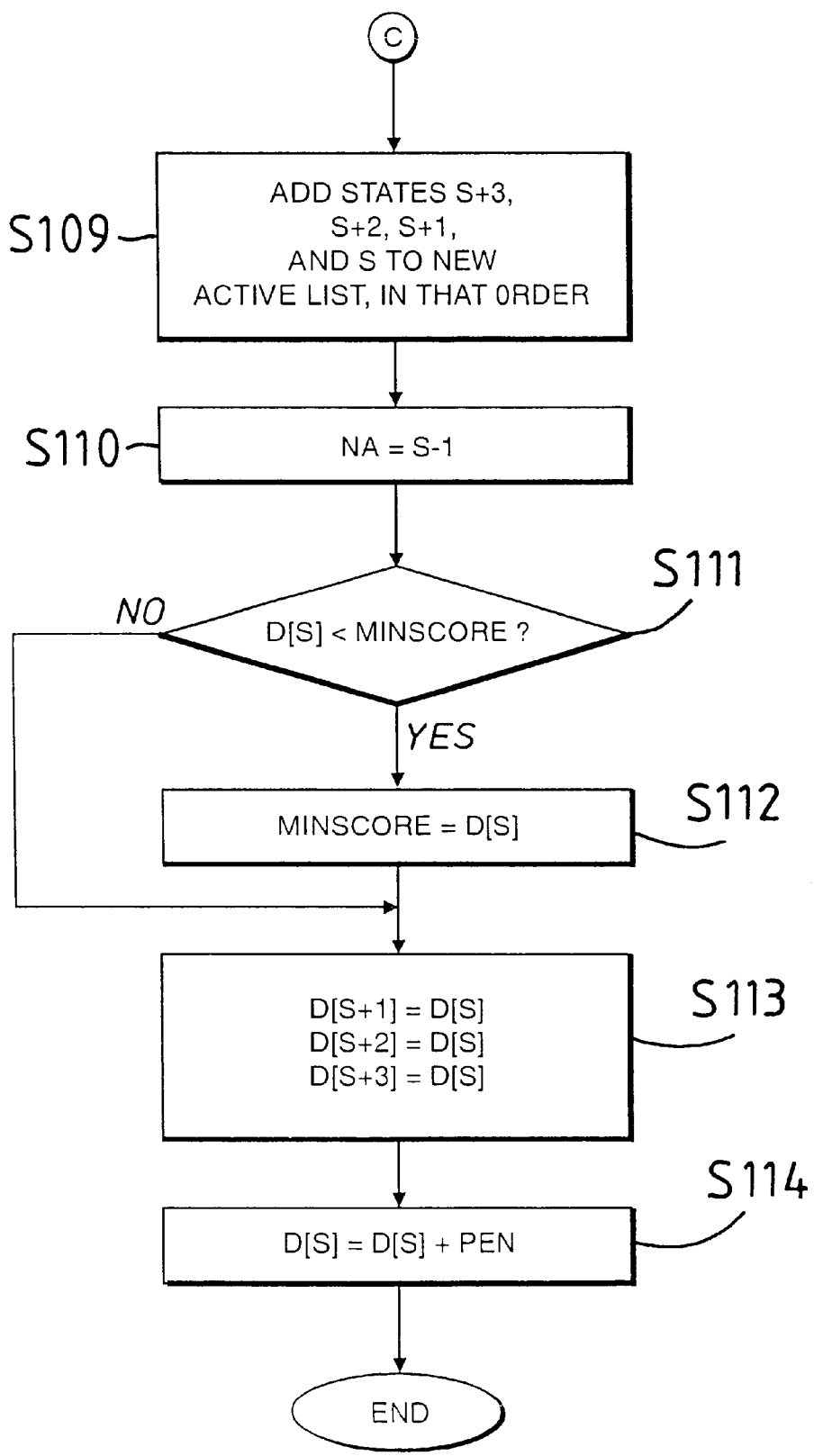

If in step S96 shown in FIG. 13a it is determined that the next active pointer NA points to a state which is more than two states beyond the current active state S, then the processing proceeds to step S109 shown in FIG. 13c, where states S+3, S+2, S+1 and S are added to the new active list, in that order. The processing then proceeds to step S110 where the next active pointer NA is set to point to state S−1. The processing then proceeds to step S111, where the system checks to see if the cumulative distance stored in the current active state S is less than the minimum cumulative distance MINSCORE for all the valid paths in all the words that have been processed for the current frame $f_k$. If it is not, then the processing proceeds to step S113, whereas if it is then, in step S112, MINSCORE is replaced by the cumulative distance stored in the current active state S.

As mentioned above, in order to proceed from step S96 shown in FIG. 13a to step S109, the next active pointer NA must have pointed to a state which is more than two states beyond the current active states. As those skilled in the art will appreciate, in this situation, with the dynamic programming constraints used in the present embodiment, there is no need to compare any cumulative distances because none of the states to which the current active state can propagate, were on the new active list. Therefore, in step S113, the system makes the cumulative distances stored in states S+1, S+2 and S+3 equal to the cumulative distance stored in the current active state S. The processing then proceeds to step S114, where the above mentioned penalty is added to the cumulative distance stored in the current active state S. The processing then ends and returns to step S79 shown in FIG. 10.

Figure 13D:
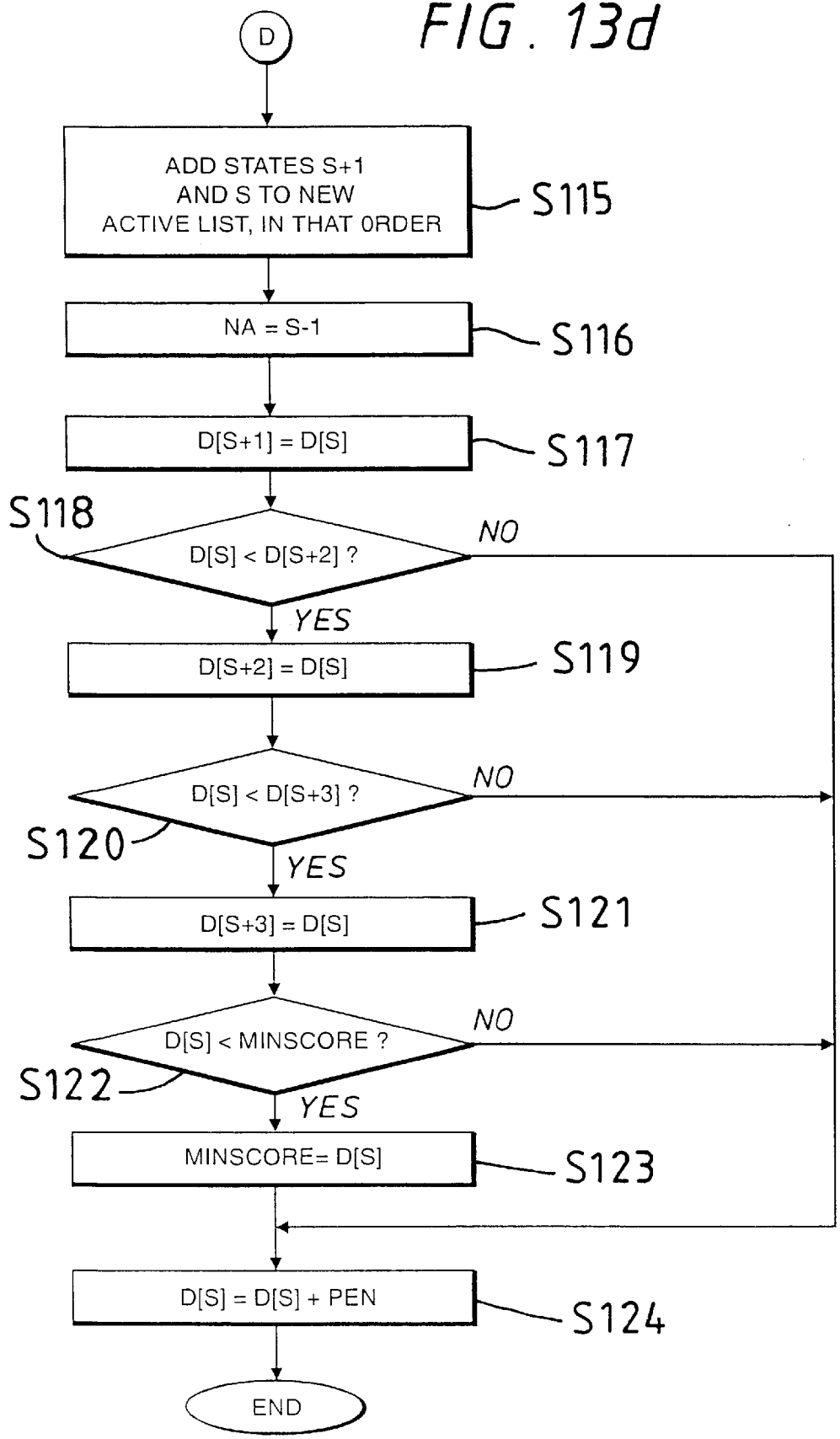

If in step S97 shown in FIG. 13a the system determines that the next active pointer NA is pointing to state S+1, then the processing proceeds to step S115 shown in FIG. 13d, where states S+1 and S are added to the new active list, in that order. The next active pointer NA is then set, in step S116, to point to state S−1. The system then makes, in step S117, cumulative distance stored in state S+1 equal to the cumulative distance stored in the current active state S. As those skilled in the art will appreciate, the system does not have to compare the cumulative distance stored in state S+1 with the cumulative distance stored in the current active state S because state S+1 was not on the new active list prior to step S115. The processing then proceeds to steps S118 to S124, which are the same as steps S102 to S108 shown in FIG. 13b and will not be described again.

If the system determines, at step S97 shown in FIG. 13a, that the next active pointer NA does not point to state S+1, then, for the dynamic programming constraints used in this embodiment, the next active pointer must be pointing to State S+2. The processing, therefore, proceeds to step S125 shown in FIG. 13e, where states S+2, S+1 and S are added to the new active list in that order. The processing then proceeds to step S126, where the next active pointer NA is set to point to state S−1. Then, in step S127, the system makes the cumulative distance stored in states S+1 and S+2 equal to the cumulative distance stored in the current active state S. As those skilled in the art will appreciate, a comparison of the cumulative distance stored in the current active state S with the cumulative distance stored in states S+1 and S+2 does not have to be made, since these states were not on the new active list prior to step S125. In step S128 the system determines whether or not the cumulative distance stored in the current active state S is less than the cumulative distance stored in state S+3. If the cumulative distance stored in the current active state S is not less than the cumulative distance stored in state S+3, then the processing passes to step S132, whereas if it is, the processing proceeds to step S129 where the cumulative distance stored in state S+3 is made equal to the cumulative distance stored in the current active state S. The system then determines in step S130 whether or not the cumulative distance stored in the current active state S is less than MINSCORE. If it is not, then the processing passes to step S132, whereas if it is, then in step S131, the system makes MINSCORE equal to the cumulative distance stored in the current active state S. The processing then proceeds to step S132, where the above mentioned penalty PEN is added to the cumulative distance stored in the current active state S. The processing then ends and returns to step S79 shown in FIG. 10.

The processing described above is performed for all states on the active list. However, when the last active state on the current active list is processed, since it is the sentential state $S_{SEN}$, the processing will pass from step S92 shown in FIG. 13a to step S133, where the sentential state $S_{SEN}$ is added to the end of the new active list. As those skilled in the art will appreciate, MINSCORE (which represents the minimum cummulative distance for all of the valid paths in all of the words upto the current frame $f_k$ being processed) is only updated in the processing steps shown in FIGS. 13b, 13c and 13d if the cumulative distance stored in states S+3, S+2 and S+1 are made equal to the cumulative distance stored in the current active state S. However, since this does not happen, in this embodiment, if the current active state S is within three states from the end of the word, an extra test is performed in step S134 to determine whether the cumulative distance stored in the exit state $S_D$ is less than MINSCORE. If it is not, then the processing returns to step S83 shown in FIG. 10, whereas if it is, MINSCORE is made equal to the cumulative distance stored in the end state $S_D$, prior to returning to step S83 shown in FIG. 10.

The operation of FIG. 13 will now be illustrated by processing the first two active states in the active list 203 shown in FIG. 8. The first active state to be processed is state $S_7$. In step S91 the system determines whether the cumulative distance stored in state $S_7$ is less than with the pruning threshold Th. If it is not, then the processing of this active state ends and the processing of the next active state is started, whereas if it is, then the processing proceeds to step S92. Since state $S_7$ is not the sentinel state $S_{SEN}$, the cumulative distance stored in this state will not equal zero (since this value is reserved for the sentinel state). Therefore, the processing proceeds to step S93, where the variable ACOUNT is incremented. In step S94, the local distance between the current active state $S_7$ and the current frame $f_k$ is calculated and added to the cumulative distance stored in state $S_7$.

Since state $S_7$ is the first active state to be processed, the next active pointer NA will point to the exit state $S_D$ which, as can be seen from the word model 201 shown in FIG. 8, is two states beyond state $S_7$. Therefore, the processing passes through steps S95, S96 and S97 to step S125 shown in FIG. 13e, where states $S_8$ and $S_7$ are added to the new active list 205 in that order. Note, however, that the exit state $S_D$ is not added to the new active list since it is only used to store the minimum cumulative distance of all the paths that leave the word. The next active pointer NA is then set, in step S126, to point to state $S_6$ and the cumulative distance stored in states $S_8$ and $S_D$ are made equal, in step S127, to the cumulative distance stored in the current active state $S_7$. The processing then proceeds to step S128 where the system checks to see if the cumulative distance stored in state $S_7$ is less than the cumulative distance stored in the sentinel state $S_{SEN}$. Since the cumulative distance stored in the sentential state is equal to zero, the processing will proceed to step S132, where the system adds a penalty to the cumulative distance stored in state $S_7$. The processing then ends and returns to step S79 shown in FIG. 10, where the count variable i is incremented so that the next active state $S_5$ will be processed.

Figure 13E:
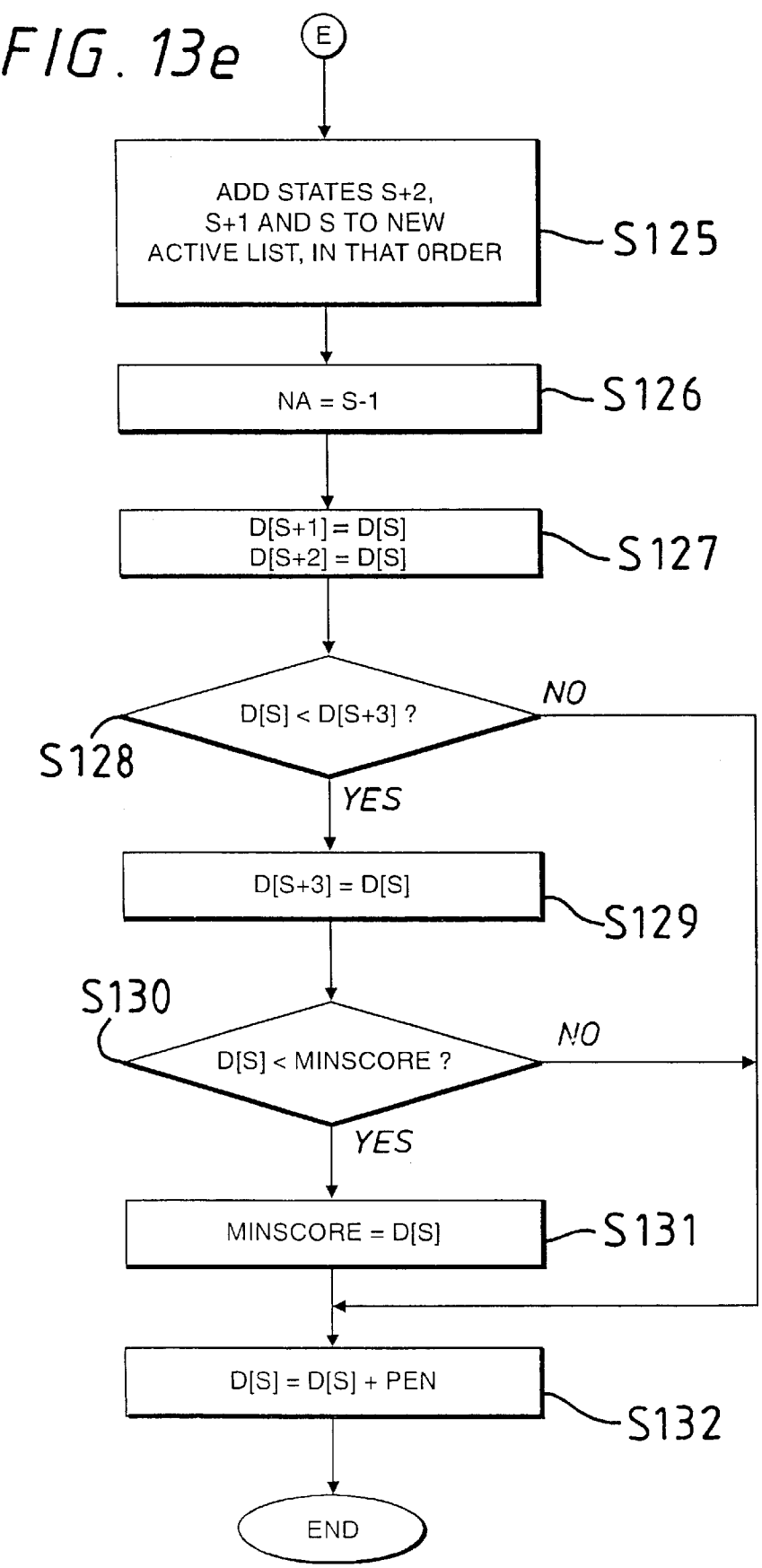
Figure 14:
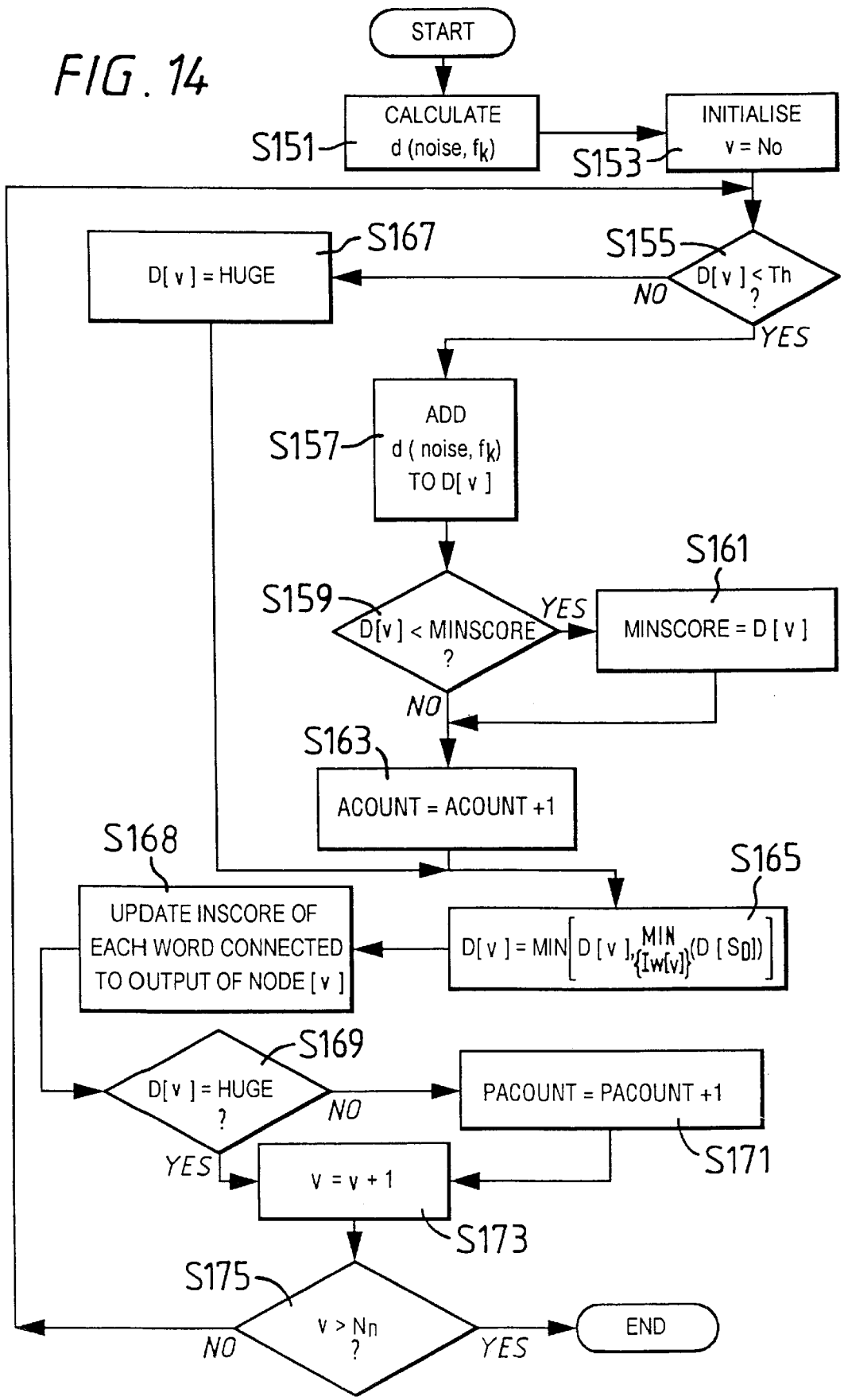
FIG. 14 is a flow chart which illustrates the processing performed in step S51 shown in FIG. 7.

The processing of state $S_5$ is the same as for state $S_7$, except that at step S97, instead of passing to step S125 shown in FIG. 13e, the processing will proceed to step S115 shown in FIG. 13d, since the next active pointer NA was set to point state $S_6$ at step S126 during the processing of active state $S_7$. Therefore, in step S115, the system adds states $S_6$ and $S_5$ to the new active list 205, in that order. The processing then proceeds to step S116, where the next active pointer NA is set to point to state $S_4$. The cumulative distance stored in state $S_6$ is then made equal, in step S117, to the cumulative distance stored in the current active state S₅. The system then compares, in step S118, the cumulative distance stored in the current active state S₅ with the cumulative distance stored in state S₇. If the cumulative distance stored in the current active state S₅ is greater than the cumulative distance stored in state S₇, then the processing proceeds to step S124, whereas if it is less than the cumulative distance stored in state S₇, then the processing proceeds to step S119, where the cumulative distance stored in state S₇ is made equal to the cumulative distance stored in the current active state S₅. A similar comparison and updating is carried out in steps S120 and S121 for the cumulative distance stored in state S₈. If the cumulative distance stored in state S₈ is updated in step S121, then the system determines, in step S122, whether or not the cumulative distance stored in the current active state S₅ is less then MINSCORE. If it is not, then the processing proceeds to step S124, whereas if it is then the cumulative distance stored in MINSCORE is replaced with the cumulative distance stored in the current active state S₅ prior to proceeding to step S124, where the penalty PEN is added to the cumulative distance stored in the current active state S₅. The processing then returns to step S79 in FIG. 10, where the count variable i is incremented so that the next active state S₄ will be processed.

This recursive processing routine is performed for all the current active states in all the reference words known to the system.

After processing each word in the above manner for the current frame $f_k$, each node in the language model 21 is processed in turn. As described above the language model 21 determines the sequences of words that are allowable. This information is defined by the nodes and in particular by the words that are connected to the inputs and outputs thereof. The processing of the nodes in step S51 of FIG. 7 ensures that valid paths only propagate through allowed sequences of words. The processing performed in step S51 will now be described in more detail with reference to FIG. 14.

Initially, prior to processing any of the nodes, the local distance between the frame representative of background noise and the current frame $f_k$ (i.e. d(noise,$f_k$)) is calculated in step S151. Then in step S153 a node pointer v is initialised to point to the start node N₀. Then in step S155 the cumulative distance stored in the node pointed to by the node pointer v, i.e. D[v], is compared with the pruning threshold Th. If D[v] is less than the pruning threshold Th then the processing proceeds to step S157 where d(noise,$f_k$) is added to the cumulative distance stored in the current node v being processed. Then in step S159 the system compares D[v] with the value stored in the minimum value store MINSCORE, and copies it into MINSCORE in step S161 if it is smaller. Then the count ACOUNT (which indicates the number of active states and nodes that have been processed for the current frame) is incremented in step S163 and the processing proceeds to step S165. Returning to step S155, if D[v] is greater than the pruning threshold Th then D[v] it is set to the large value HUGE in step S167 and the processing proceeds to step S165.

Figure 15:
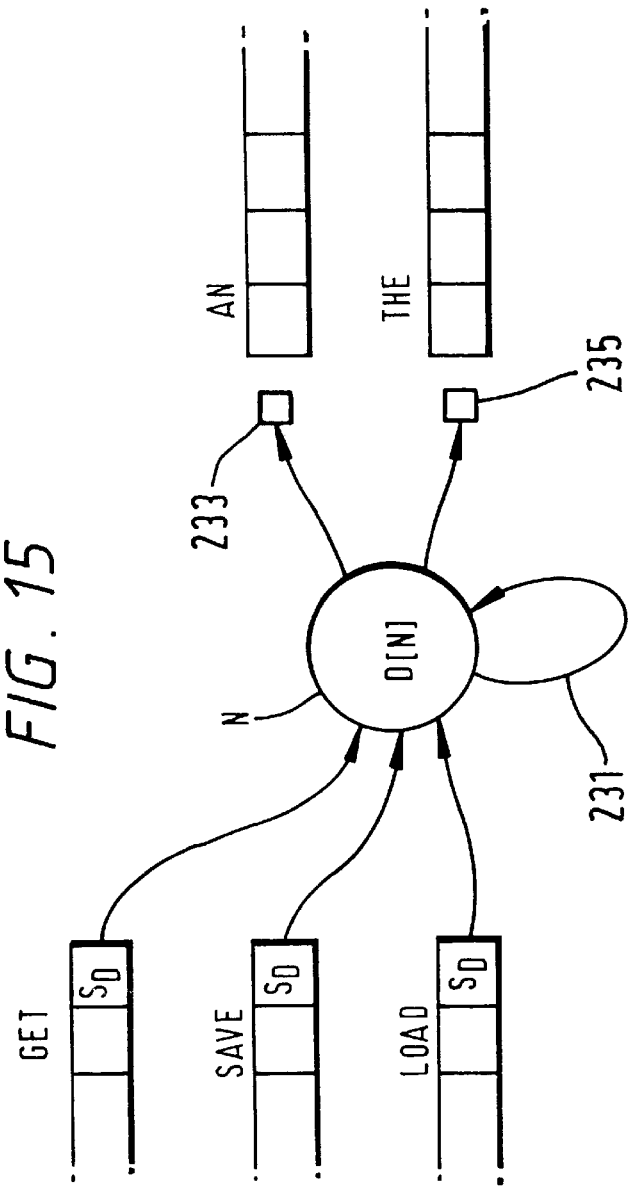
FIG. 15 is a schematic representation of the processing performed to an exemplary node N during the processing illustrated in FIG. 14.

The processing performed in step S165 and step S168 will be explained for the example node N shown in FIG. 15, which has the three words "get", "save" and "load" connected to its input and the words "an" and "the" connected to its output. Although such a node is not shown in FIG. 3, this example has been chosen to illustrate that the dynamic programming process of the present embodiment will work for more complex language models. In particular, finite state grammars where nodes like the one shown in FIG. 15 are commonplace.

In step S165 the system determines the minimum of all the cumulative distances stored in the exit states (S_D) for the words connected to the input of node N, i.e. the exit states of words "get", "save" and "load". For the general case, this calculation is represented by:

$$\MIN_{\{I_w[v]\}} (D[S_D]) \tag{8}$$

where $I_w[v]$ represents all the words connected to the input of node v. After the system has determined this minimum cumulative distance for node N, it is copied into the cumulative distance D[N] stored in node N if it is smaller than the cumulative distance already stored there. In effect, this is a determination of whether there is a valid path coming from one of the words connected to the input of the node which has a smaller cumulative distance than the cumulative distance of the path which is still propagating in the node.

It is possible for valid paths to propagate within the node because it is possible that there are gaps before, between and at the end of the words in the phrase which match with the background noise frame. This possibility of a valid path remaining within a node from one input frame to the next is represented by the arrow 231 shown in FIG. 15, which leaves and returns to node N. A path may remain within a node for any number of consecutive input frames. After the system has performed the processing of step S165 the cumulative distance stored in node N is copied, in step S168, into the temporary store INSCORE, represented by boxes 233 and 235 for words "an" and "the" respectively, if it is smaller than the value already stored there. A comparison must be made since it is possible that a word may be connected to the output of more than one node, and it is only the path having the minimum cumulative distance that is propagated into the connecting word. The cumulative distance stored in the temporary store INSCORE of a word is used to update the entry states of that word during the processing in step S57 shown in FIG. 7.

The system then checks, in step S169, whether D[v] equals the large value HUGE. If it does, then this indicates that no valid paths will end or pass through the current node v into a word connected to it at the next frame $f_{k+1}$. If D[v] is less than the large value HUGE, then a valid path will either end at the node v or pass through it into a word connected to it, at the next frame $f_{k+1}$. Therefore, the counter PACOUNT, which represents the number of potentially active states (and nodes) at the next input frame $f_{k+1}$, is incremented in step S171 since the silence state associated with that node may be active at the next input frame $f_{k+1}$. The node pointer v is then incremented in step S173 so that it will point to the next node in the language model 21. The system then checks to see if all the nodes in the language model 21 have been processed in step S175, by checking to see if the node pointer v indicates a node which is beyond the end node $N_n$ in the language model 21. If the system has not finished processing all the nodes, then the processing returns to step S155, whereas if all the nodes have been processed then the processing returns to step S53 shown in FIG. 7.

Figure 16:
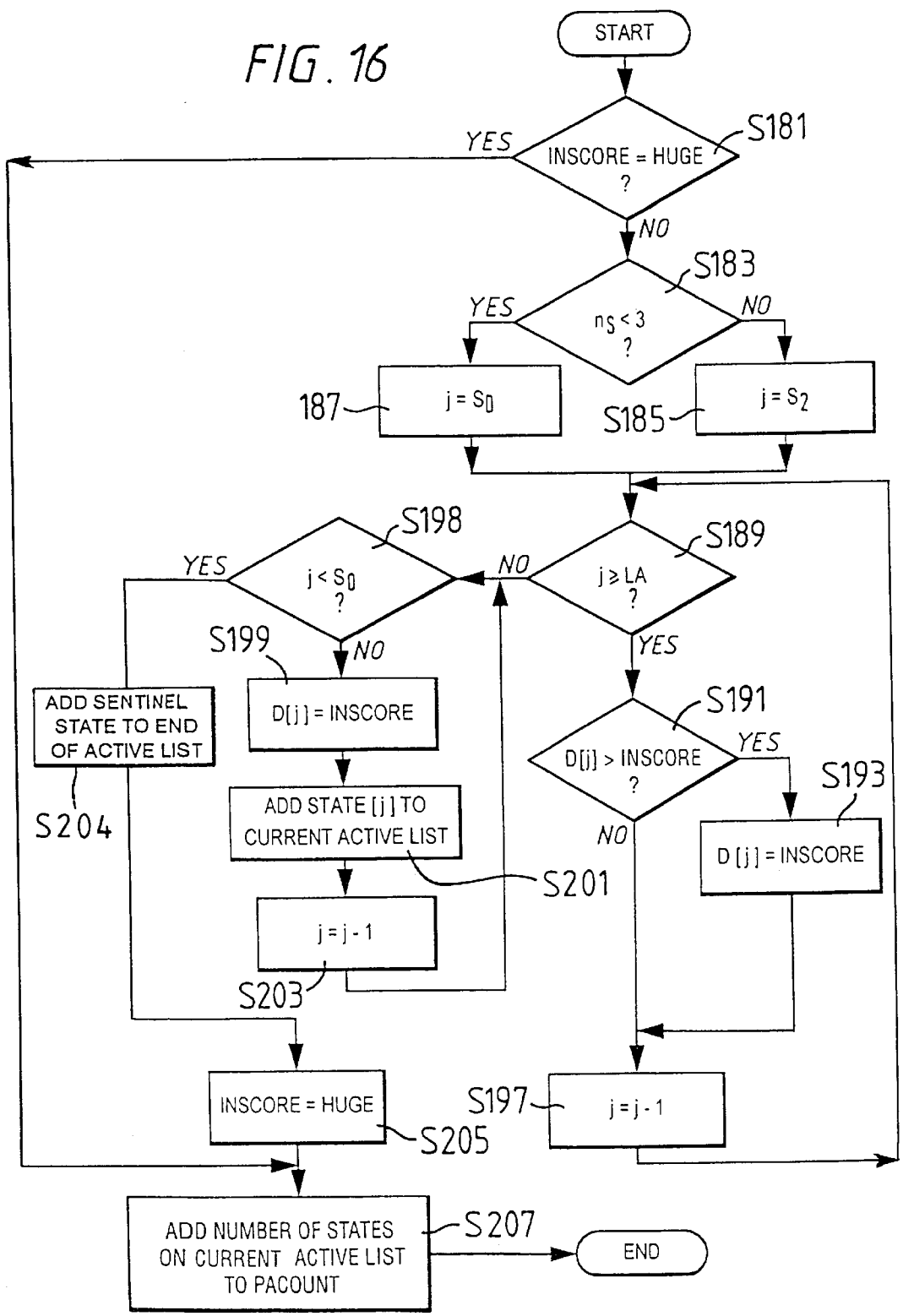
FIG. 16 is a flow chart which illustrates the steps involved in step S57 shown in FIG. 7.

The processing performed in step S57 shown in FIG. 7 will now be described in more detail with reference to FIGS. 16 and 17, for the word model 201 shown in FIG. 8 and the dynamic programming paths shown in FIG. 9. Referring to FIG. 16, in step S181 the system checks to see if the cumulative distance stored in INSCORE equals the large value HUGE. If it does then this means that no valid paths will be entering this word at the next time point. Therefore, this word does not need to be processed again, so the processing proceeds to step S207 where the number of active states for that word which will be processed for the next input frame $f_{k+1}$ (which is determined from the number of states listed in the current active list 203; due to step S83 shown in FIG. 10), is added to the count PACOUNT. The processing then returns to step S59 shown in FIG. 7 where the word count is incremented so that the next word model will be processed.

If on the other hand, at step S181, INSCORE is not equal to the large value HUGE, then this means that a valid path has left a preceding word and may enter the current word being processed. Therefore, the states of the current word model which can be reached by a path extending from another word model (which will be referred to hereinafter as the entry states) must be updated using the cumulative distance stored in INSCORE. In the present embodiment with the above dynamic programming constraints the entry states are states $S_0$, $S_1$ and $S_2$. This updating can be achieved using a similar processing technique to that described with reference to FIG. 13, but in this embodiment is performed in the following manner.

Firstly in step S183 the system checks to see if the word model representative of the current word being processed contains more than three states (not including the exit state $S_D$ or the sentinel state $S_{SEN}$). If there are more than three states, then a state pointer j is set to point to state $S_2$ in step S185. If on there other hand there are less than three states in the current word, then the state pointer j is set, in step S187, to point to the exit state $S_D$. The processing then proceeds to step S189 where the state indicated by pointer j is compared with the state indicated by the last active pointer LA. If the state indicated by pointer j is beyond the state indicated by the last active pointer LA, then a comparison has to be made between the cumulative distance already stored in that state and the cumulative distance stored in INSCORE. For the example paths shown in FIG. 9, path p6 can propagate to states $S_1$, $S_2$, $S_3$ and $S_4$ at the next frame $f_{k+1}$. Therefore, in this example, after processing all the active states on the current active list 203 in accordance with the flow charts shown in FIG. 10, the last active pointer LA will point to state $S_1$.

Figure 17:
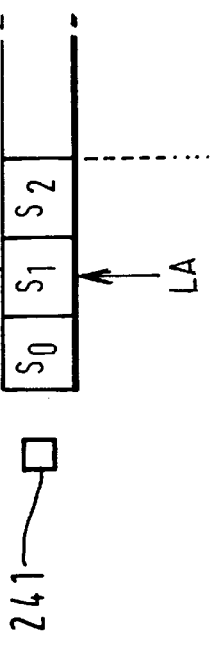
FIG. 17 is a schematic diagram illustrating the entry states of the word model shown in FIG. 8.

FIG. 17 shows the entry states (i.e. the first three states) of the word model 201 shown in FIG. 8. As shown, the last active pointer LA points to state $S_1$. Since there are more than three states in the word model 201 the state pointer j will point to state $S_2$. Therefore, the system will determine, in step S189, that the state indicated by pointer j is beyond the state indicated by the last active pointer LA, i.e. state $S_1$, and therefore, the processing proceeds to step S191. In step S191 the system compares the cumulative distance stored in state $S_2$ with the cumulative distance stored in the temporary store INSCORE associated with word model 201, which is represented by rectangular box 241 shown in FIG. 17. If the cumulative distance stored in INSCORE is smaller than the cumulative distance stored in state $S_2$, then it is copied into state $S_2$ in step S193 and the processing then proceeds to steps S197. If the cumulative distance stored in INSCORE is greater than the cumulative distance stored in state $S_2$, then the cumulative distance stored in state $S_2$ is unchanged and the processing proceeds to step S197 where the pointer j is decremented so that it now points to state $S_1$. The processing then returns to step S189 and the same processing is performed to state $S_1$.

After processing state $S_1$ the pointer j is decremented again in step S197, so that it points to state $S_0$. Consequently, the processing will proceed to step S198 after step S189, where the system checks to see if there are any more states to be processed. Since state $S_0$ is still to be processed, the system proceeds to step S199 where the cumulative distance stored in INSCORE is copied into state $S_0$. No comparison of cumulative distances has to be performed for state $S_0$ as this state is before the last active state pointed to by the last active pointer. The system then adds, in step S201 state $S_0$ to the current active list (which was the new active list 205 prior to step S83 in FIG. 10) overwriting the sentinel state $S_{SEN}$ which was the last state to be added to the current active list in step S133 shown in FIG. 13a. The system then decrements, in step S203, the pointer j so that it now points to state $S_{-1}$. The processing then returns to step S198 where the system determines that there are no more entry states in the current word to be processed. The processing then proceeds to step S204, where the sentinel state $S_{SEN}$ is again added to the end of the current active list, since it may have been overwritten in step S201. After step S204, the processing then proceeds to step S205 where the cumulative distance stored in the corresponding temporary store INSCORE is reset to the large value HUGE. The number of states on the current active list is then added, in step S207, to the count PACOUNT and the processing returns to step S59 shown in FIG. 7.

Pruning

Referring to FIG. 7, if in step S63 the system determines that there are more input frames to be processed, then the processing proceeds to step S65 where the pruning threshold Th is adjusted. The aim of using pruning is to limit the number of dynamic programming paths that propagate from one time point to the next. In particular, the present embodiment aims to adjust the pruning threshold so that the number of active states that are actually processed remains essentially bounded within predefined limits, which are dictated by the amount of working memory and processing time available.

Furthermore, the present embodiment also aims to achieve this without the need for expensive computational overheads.

One way of ensuring that only a set number of active states are processed for each input frame is to sort the active states that are on all the active lists for the input frame about to be processed in order of increasing cumulative distances stored therein, and then only processing the desired number beginning with the one with the lowest cumulative distance. However, this technique requires a large amount of computational time to sort out the active states. Rather than performing this computationally expensive sorting, the technique employed in the present embodiment makes use of the information available after processing the last input frame. In particular, in this embodiment a differential value (PRUNING) is varied in dependence upon the number of states that are potentially active (which is stored in PACOUNT) for the next input frame to be processed, in order to maintain the number of states that will actually be processed, to be between two thresholds. The manner in which the differential value PRUNING is varied will now be described in more detail with reference to FIG. 18.

In step S211 the system compares the number of states that are potentially active for the next frame to be processed (which is stored in PACOUNT) with a state threshold (STATETH), which is set to be less than but close to an absolute maximum state threshold determined by the amount of working memory available. If the value stored in PACOUNT is less than STATETH then this means that all the potentially active states can be processed, and therefore, the differential value PRUNING used at the last time point can be increased. Therefore, in step S213 an adjustment constant dp1 is added to the existing differential value, PRUNING. The value of dP1 is set to be larger than any reasonable local distance, so that most, if not all, of the potentially active states will be processed.

The value stored in PRUNING is then compared with a high pruning threshold, HIGHPRTH in step S215. An upper limit is placed on the differential value PRUNING as it is assumed that there is a maximum differential value above which there is never any need to go. If the value stored in PRUNING is less than HIGHPRTH then the processing proceeds to step S219. If the value stored in PRUNING is greater than HIGHPRTH then PRUNING is set to equal HIGHPRTH in step S217. After step S215 or step S217 the system sets the pruning threshold Th. The processing then returns to step S43 shown in FIG. 7.

If at step S211 the system determines that the number of potentially active states, PACOUNT, for the next frame is greater than STATETH, then the system compares, in step S221, the number of states that were active and processed during the processing of the last input frame (which is stored in ACOUNT) with a low state threshold, LOWSTTH. The value of LOWSTTH is set to try and ensure that if ACOUNT is less than LOWSTTH, then it will be possible to process all the potentially active states for the next input frame without taking too much time or memory. Therefore, if ACOUNT is less than LOWSTTH, then the processing passes from step S221 to step S213 where the differential value PRUNING is adjusted and the processing proceeds as described above. If, on the other hand, ACOUNT is greater than LOWSTTH then there is no guarantee that if all the potentially active states are processed then this will not take too much time or memory to process. Therefore, it may be necessary to reduce the differential value PRUNING.

In order to determine whether the differential value PRUNING needs to be reduced, the system compares ACOUNT with STATETH in step S223. If ACOUNT is less than STATETH then the system checks to see if the differential value PRUNING is equal to HIGHPRTH. If it does equal HIGHPRTH then this indicates that the system has been trying to process all the active states, and that therefore, it is unlikely that the number of active states that will be processed for the next input frame will result in the process taking too long or too much memory. Therefore, the differential value PRUNING is not changed and the processing passes to step S219 where the pruning threshold is set. If on the other hand, the differential value PRUNING is not equal to HIGHPRTH (in which case it must be less than it), then it is possible that the number of active states that will be processed for the next input frame will take too long or too much memory. Therefore, the actual number of active states that will be processed must be calculated or estimated. This is performed in step S233 using the pruning threshold set in step S231 which uses an unchanged differential value PRUNING.

Returning to step S223, if the system determines that ACOUNT is greater than STATETH then the differential value PRUNING is reduced by the adjustment constant dp1 in step S225. After the differential value PRUNING has been decreased in step S225, the system determines in step S227 whether the differential value PRUNING is less than a low pruning threshold, LOWPRTH. A low pruning threshold is used to ensure that the number of active states that will be processed for the next input frame, will be greater than a set emergency state threshold, EMGSTTH. The reason for this is that it has been found that the dynamic programming process fails if it is pruned too heavily. If the differential value PRUNING is less than the low pruning threshold LOWPRTH, then it is made equal to LOWPRTH in step S229, and the pruning threshold Th is set, in step S231, using the adjusted differential value PRUNING. Subsequently, in step S233, the system estimates the number of active states (and nodes) that will be processed for the next input frame by firstly estimating the state density by dividing the number of active states which were processed during the prosessing of the last input frame, ie ACOUNT, by the value of PRUNING used during the processing of the last input frame and then estimating the number of active states that will be processed for the next input frame ($En_{sa}$) by multiplying the estimated state density with the new value of PRUNING.

If this estimated number $En_{sa}$ is less than the emergency state threshold, EMGSTTH, then the pruning threshold has been set too low and the processing returns to step S213 where the differential value PRUNING is increased and the pruning threshold Th is reset. If $En_{sa}$ is not less than EMGSTTH then it is compared with LOWSTTH in step S237. If $En_{sa}$ is greater than LOWSTTH then this implies that the pruning threshold Th set in step S231 is acceptable and the processing ends and returns to step S43 shown in FIG. 7. If on the other hand, $En_{sa}$ is less than LOWSTTH, then the pruning threshold can be increased, and so a second adjustment constant dp2 is added to the differential value PRUNING in step S239, prior to the pruning threshold Th being reset in step S219. In this embodiment the second adjustment constant dp2 is set to equal half the adjustment constant dp1.

Figure 18:
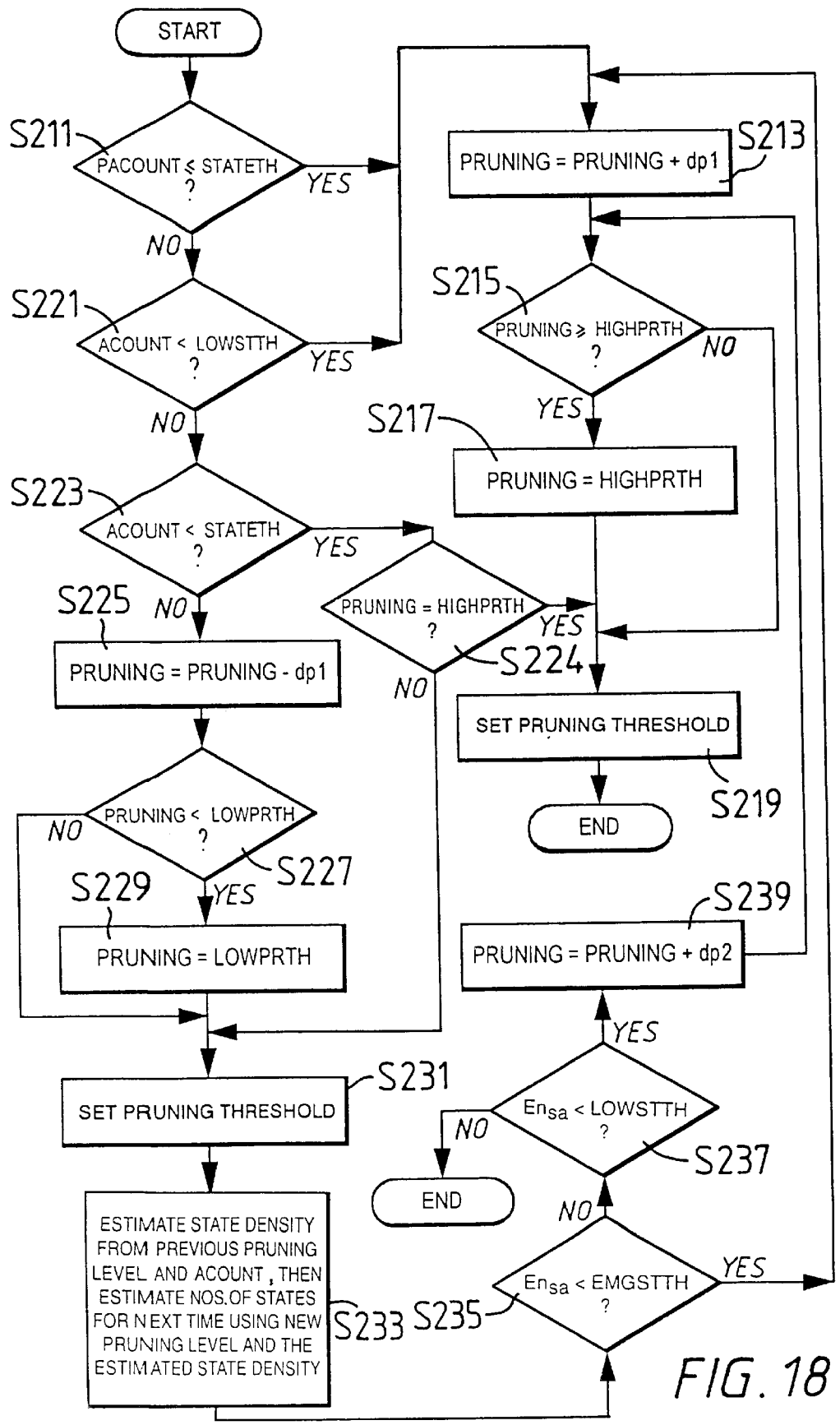
FIG. 18 is a flow chart which illustrates the steps performed in step S65 shown in FIG. 7.
Figure 19:
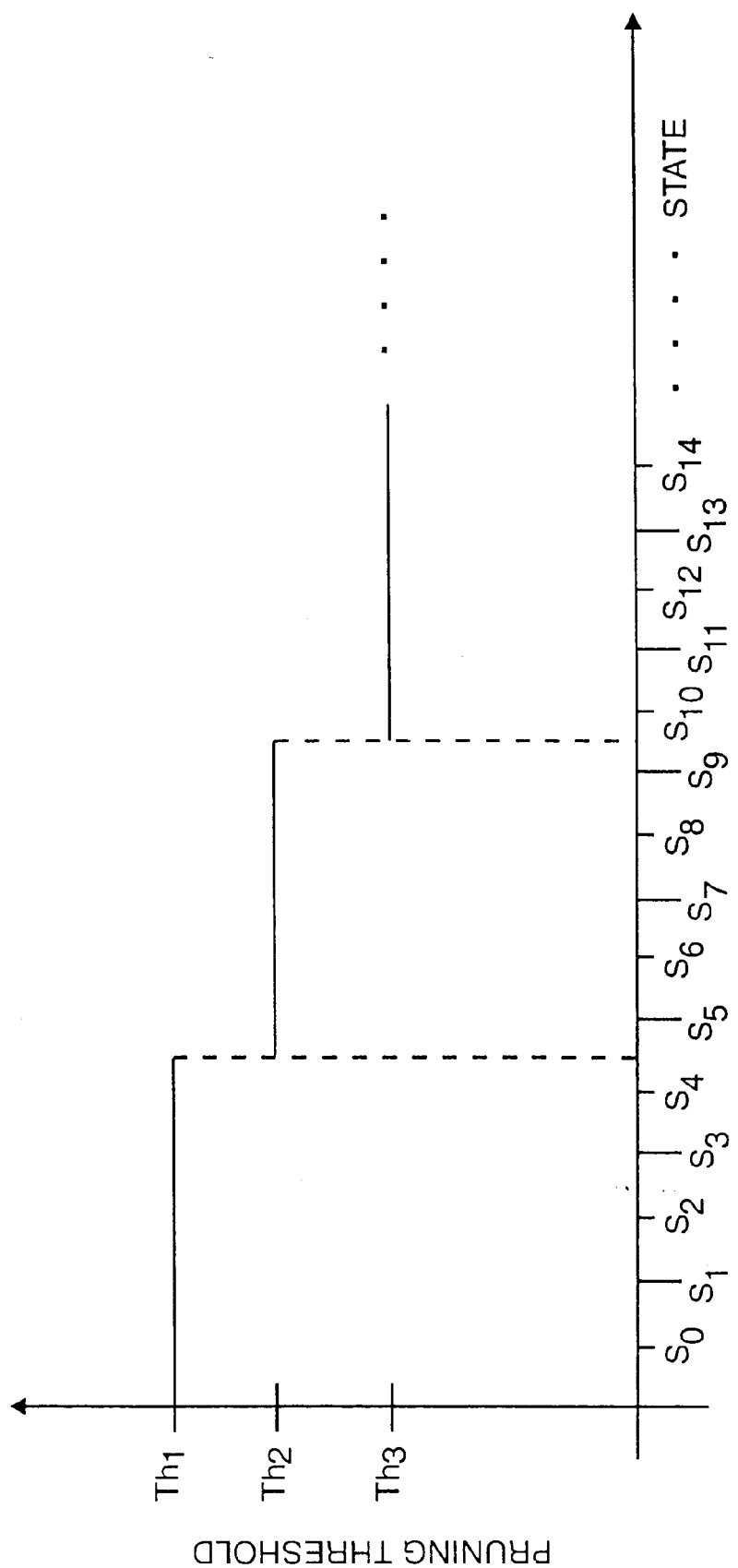
FIG. 19 is a plot illustrating the different pruning thresholds used for the states of each word.

In steps S219 and S231 shown in FIG. 18, the pruning threshold Th is set. This can be done by adding the variable differential value (PRUNING) which has just been calculated to the overall minimum cumulative distance MINSCORE determined for the input frame just processed. However, the inventors have identified that the difference between the globally optimal path and the local minimum tends to be the greatest when the globally optimal path is traversing the first few states of the correct word. Consequently, in this embodiment, the pruning threshold is adjusted so as to be greater nearer the beginning of the word and smaller towards the end of the word. This is achieved in the present embodiment, by using a first pruning threshold $Th_1$ for the first five states of each word, using a second smaller pruning threshold $Th_2$ for the next five states of each word and using a third pruning threshold $Th_3$ for the remaining states of each word, as illustrated in FIG. 19. In this embodiment, the three pruning thresholds $Th_1$, $Th_2$ and $Th_3$ are determined from the following:

$Th_1$=MINSCORE+PRUNING $Th_2$=MINSCORE+0.75. PRUNING $Th_3$=MINSCORE+0.5. PRUNING

As those skilled in the art will appreciate, the pruning which is being performed makes a hard decision as to whether or not each path should propagate any further. In particular, everything below the pruning threshold is processed, whereas everything above is pruned. The problem with performing such a hard pruning technique is that there is an increased likelihood of a pruning error, and therefore an error in the recognition result. This is because, if the cumulative distance for the globally optimal path is more than the pruning threshold, then at the point where the globally optimal path is pruned out, states in the neighbourhood of the current state of the globally optimal path will have similar cumulative distances and are therefore also likely to be pruned out by the hard pruning technique. Therefore, improved pruning can be achieved by adopting a "softer" pruning technique, where there is a region surrounding the pruning threshold such that some, but not all, paths falling within this region are pruned. Therefore, even if the optimal path is pruned out, paths sufficiently close to the optimal path will be retained, so that the pruning does not result in recognition errors.

Such a soft pruning technique can be achieved in a number of different ways. For example, a random number generator could be used to randomly chose whether or not paths having cumulative distances within a predefined region should be pruned. However, since the pruning decision needs to be made for all active states at every time step, it should be made as simple as possible, otherwise the pruning technique would require too much processing time. In the present embodiment, a vector of pruning thresholds Th[s] is calculated for every input frame $f_k$. The values of the pruning thresholds in the vector are calculated by first calculating the above mentioned three pruning thresholds $Th_1$, $Th_2$ and $Th_3$, then subtracting a constant $\delta$ from the appropriate pruning thresholds for states 2, 5, 8 etc and subtracting $2\delta$ from the appropriate pruning thresholds for states 0, 3, 6 etc, as illustrated in FIG. 20. The inventors have established, that with this three level soft pruning a 30% reduction in the number of active states that have to be processed is achieved, with the same pruning error rate as a single level hard pruning technique.

As those skilled in the art will appreciate, the number of pruning levels used and the variation about each level should be chosen having regard to the dynamic programming constraints which are being used, so that even if the optimal path is pruned out, a path sufficiently close to the optimal path will be retained.

As those skilled in the art will realise, the above method of varying the pruning threshold is not computationally expensive, yet it allows the pruning threshold to be adjusted in such a manner that the number of active states that are processed at each time point is bounded, so that the allocated processing time and memory are not exceeded.

Backtracking

After all the frames in the input sequence have been processed using the sequence of processing steps illustrated in FIG. 7 a backtracking routine is required to determine the exact path taken by the optimum path determined by the dynamic programming process. In this embodiment the backtracking routine traces through backpointers which indicate the sequence of words through which each path propagates. The details of the way in which the backtracking routine is performed, and the way in which the pointers are generated are well known to those skilled in the art of speech processing, and will not be described further.

Initialisation

Before the system attempts to recognise an input utterance, the system thresholds and variables which are used during the recognition process must be initialised. This is achieved in the following manner. Firstly the cumulative distance stored in the start node $N_0$ is set to a nominal value and the cumulative distance stored in all the other nodes is set to equal the large value, HUGE. Then the counter which counts the number of potentially active states, PACOUNT, associated with each word model is set to zero; the next active pointer associated with each word model is set to point to the end state $S_D$ of that model; and the temporary store INSCORE associated with each word model is set to the large value, HUGE. All the nodes are then processed so that the minimum of the cumulative distances of all the nodes connected to the input of a word is copied into the temporary store INSCORE associated with that word. This ensures that the temporary store INSCORE of each word connected to the start node $N_0$ is set to the nominal value. Finally, the value stored in INSCORE of each word is used to activate and initialise the entry states of each word model. The processing steps to initialise the entry states of each word model are identical to the processing steps used to update the entry states described above with reference to FIG. 16. The pruning thresholds and the differential value PRUNING are also initialised prior to the processing of the first input frame. In particular, the pruning thresholds $Th_1$, $Th_2$ and $Th_3$ are set to the large value, HUGE, and the differential value PRUNING is set to equal the high pruning threshold, HIGHPRTH.

Alternative Embodiments

A number of modifications can be made to the above speech recognition system without departing from the inventive concept of the present invention. A number of these modifications will now be described.

Although in the above embodiment, the whole utterance is received before it is processed, the system can run incrementally whereby as the speech is received it is processed. In such an embodiment, an input buffer would still be required, but it would only need to be able to store incoming speech corresponding to one frame. As those skilled in the art will realise, in order for this system to work, the entire processing of the frame of input speech (by the preprocessor and the recognition block), must be finished before the next frame of input speech is ready to be processed.

In the first embodiment, the states of the word models which were at the end of a dynamic programming path were listed in an active list associated with that word model.

In an alternative embodiment a single global active list could be provided in which all the active states of all the word models would be listed. In such an alternative embodiment, information would have to be stored associated with the global active list, for identifying which word models the particular active states belong to.

In the first embodiment, use was made of equation (4) to speed up the processing involved in propagating the valid dynamic programming paths within each word for the next time step. Additionally, the search was organised so that the most likely situations were checked before the least likely. Similar processing techniques could be employed to propagate the valid dynamic programming paths from one word to the next.

In the first embodiment, the states of the word models correspond in time duration to the frames of the input speech to be recognised. In an alternative embodiment, each state of a word model could be equivalent in time duration to, for example, three consecutive frames of the input speech. In such an alternative embodiment, the input frames could be averaged in groups of three and then aligned with the states of the word models.

In the first embodiment, the single best dynamic programming path through the word models is determined.

As those skilled in the art will appreciate, the algorithm could easily be adapted so that the N-best matches are determined, so that if there is an error in the recognition result, the system can offer alternatives without having to re-input the phrase for recognition a second time.

In yet another alternative embodiment, the word models could be statistical models, for example Hidden Markov models, well known to those skilled in the art of speech recognition. In such an embodiment, rather than determining the minimum cumulative distance between the input utterance and the sequences of word models, the maximum probability that the input sequence was generated by a particular sequence of Hidden Markov models would be determined.

In the first embodiment, the reference models used correspond to whole words. As those skilled in the art will realise, this is not essential. The reference models could correspond to parts of words, e.g. syllables, to a plurality of words or even to individual phonemes. However, the disadvantage of using reference models which correspond to phonemes is that the system becomes language dependent. Further, reference models which are equivalent to whole words are preferred to those equivalent to whole phrases because there is a potential for time and computational savings. In particular, by modelling the words within phrases and by using a language model, it is possible to teach the system many different phrases using only a handful of words. If on the other hand, the reference models corresponded to the whole phrases, then a reference model would be required for each of the different phrases to be learnt by the system. In addition to this advantage, the use of reference models which correspond to words also increases the system's flexibility to gaps between the words in the phrase. This is possible because of the environment model which can appear at the beginning or end of the phrase and also between the words in the phrase.

In yet another alternative embodiment, the reference models could be compressed if consecutive frames of the model are similar. If this situation arises then the consecutive similar frames would be replaced by a single frame.

In the language model shown in FIG. 17, if a word can be followed by two different words, then no preference is placed on which of the two words will follow that word. In an alternative embodiment, it would be possible to weigh some sequences of words more favourably than others. For example, for the phrases illustrated in FIG. 17a, it may be known that the phrase "make it more . . . " (followed by a colour) is more common than the phrases "make it smaller", or "make it larger" or "make it brighter". Therefore, the transition from node $N_7$ to node $N_8$ is made stronger compared to the transition from node $N_7$ to the end node $N_n$. This can be achieved by using weighing factors which weigh the cumulative distances being propagated from node $N_7$ to the input of words "more", "smaller", "larger" and "brighter".

As those skilled in the art will realise, the language model used to define the allowed sequences of words does not have to be a Bigram model, but could be any known type of language model, for example a finite state grammar model. If the type of language model used is changed, then some modifications would have to be made to the dynamic programming matching process described above, but such modifications would be apparent to those skilled in the art of speech recognition. However, the essential features of the matching process would remain unchanged, as these are designed to be suitable for use in any pattern matching process.

In addition, it will be apparent to those skilled in the art of pattern matching, that the method of implementing the dynamic programming matching process could also be used for matching other types of patterns. For example, it is envisaged that the above described pattern matching process could be used in handwriting recognition or in other pattern matching applications.

Although a continuous word speech recognition system is described in the first embodiment described above, it will be apparent to those skilled in the art that the system described above could equally apply to other kinds of speech recognition systems.

The speech recognition system described in the first embodiment can be used in conjunction with many different software applications, for example, a spreadsheet package, a graphics package, a word processor package etc. If the speech recognition system is to be used with a plurality of such software applications, then it might be advantageous to have separate word and language models for each application, especially if the phrases used in each application are different. The reason for this is that as the number of word models increases and as the language model increases in size, the time taken for the system to recognise an input utterance increases. Therefore, by having separate word and language models for each application, the speed of the speech recognition system can be maintained. Additionally, several word and language models could be used for each application.

Additionally, as those skilled in the art will appreciate, the above speech recognition system can also be used in many different types of hardware. For example, apart from the obvious use in a personal computer or the like, the speech recognition system could be used as a user interface to a facsimile machine, telephone, printer, photocopier or any machine having a human/machine interface.

The present invention is not intended to be limited by the exemplary embodiments described above, and various other modifications and embodiments will be apparent to those skilled in the art.

What is claimed is:

1. A method of matching a first sequence of patterns representative of a first signal with a second sequence of patterns representative of a second signal, wherein the method processes each first signal pattern in-turn by:

defining as active patterns the second signal patterns which are at the end of a path for a current first signal pattern being processed, each path representing a possible matching between an ordered sequence of second signal patterns and an ordered sequence of first signal patterns ending at said current first signal pattern;

for each active pattern, storing a cumulative value which is indicative of the closeness of the match for the path which ends at that active pattern for said current first signal pattern; and updating said cumulative values and propagating said paths based on constraints which are placed on the path propagation, by processing each active pattern in reverse sequential order, by:

(i) determining which of the second signal patterns the path ending at the current active pattern can propagate to for the succeeding first signal pattern to be processed, based upon said path propagation constraints;

(ii) identifying how many of the second signal patterns determined in step (i) have previously been so determined during the processing of a previous active pattern for the current first signal pattern being processed; and (iii) propagating the path associated with the current active pattern in dependence upon how many of said second signal patterns are identified in said step (ii).

2. A method according to claim 1, wherein said step (iii) performs a comparison step for those second signal patterns identified in step (ii) before propagating the path associated with the current active pattern to those second signal patterns and wherein said step (iii) propagates the path associated with the current active pattern to the second signal patterns which are not identified in said step (ii) without preforming a comparison step.

3. A method according to claim 2, wherein each second signal pattern has a store, D[ ], associated therewith for storing the cumulative value of the best path which ends at that second signal pattern for the current first signal pattern being processed, and wherein said comparison step compares the cumulative value stored in the current active pattern with the cumulative value stored in the store associated with at least one of the second signal patterns identified in said step (ii).

4. A method according to claim 3, wherein said step (iii) comprises the steps of:

(a) comparing D[S] with D[S+N+1−m];

(b) if D[S] is better than D[S+N+1−m], then propagating the path ending at the current active pattern to the second signal pattern S+N+1−m by making D[S+N+1−m]=D[S], decrementing m and returning to step (a); and (c) if D[S] is worse than D[S+N+1−m], then not propagating the path ending at the current active pattern to the second signal pattern S+N−1−m or any second signal pattern sequentially beyond second signal pattern S+N+1−m;

where S is the current active pattern being processed, N is the number of second signal patterns which are sequentially beyond the current active pattern to which the path ending at the current active pattern can propagate for the succeeding first signal pattern to be processed and m is a positive integer variable which is initially set at the number of second signal patterns identified in said step (ii).

5. A method according to claim 4, wherein said steps (a), (b) and (c) are performed while m is greater than zero.

6. A method according to claim 4, wherein m is less than N.

7. A method according to claim 4, further comprising the step of storing the minimum cumulative value of all paths being propagated and wherein if the path associated with the current active pattern is propagated to the second signal pattern S+N by making D[S+N]=D[S], then the method further comprises the steps of comparing D[S] with said minimum cumulative value and making the minimum cumulative value equal to D[S] if D[S] is better than the minimum cumulative value.

8. A method according to claim 1, wherein said active patterns for the current first signal pattern are listed, in reverse sequential order, in a current active list, and wherein the second signal patterns identified in step (i) are listed, if they are not already listed, in a new active list in reverse sequential order.

9. A method according to claim 8, further comprising the step of using an identifier to identify the second signal pattern which is the earliest in the sequence of second signal patterns which is listed in the new active list after processing the preceding active pattern, and wherein said step (ii) identifies how many of the second signal patterns determined in step (i) have previously been so determined by determining a positional relationship between the current active pattern being processed and the second signal pattern which is identified by said identifier.

10. A method according to claim 9, wherein said positional relationship is determined by testing for the different possibilities which the relationship can have.

11. A method according to claim 10, wherein the method identifies said positional relationship by testing for the following situations:

(A) the identifier identifies a second signal pattern which sequentially immediately succeeds the current active pattern being processed;

(B) the identifier identifies a second signal pattern which is sequentially beyond second signal pattern S+N;

(C) the identifier identifies a second signal pattern S+i, for i=1 to N−1;

where S is the current active pattern being processed and N is the number of second signal patterns which are beyond the current active pattern to which the path ending at the current active pattern can propagate to for the succeeding first signal pattern.

12. A method according to claim 11, wherein the method tests for situation (A) first and only tests for situation (B) if situation (A) is false.

13. A method according to claim 12, wherein the method tests for situation (C) only if situation (B) is false.

14. A method according to claim 13, wherein the method test situation (C) for a current value of i and only tests for situation (C) for i+1 if situation (C) for i is false.

15. A method according to claim 9, wherein after the new active list has been updated by the processing of the current active pattern, said identifier is set to identify the second signal pattern on the new active list which is the earliest in the sequence of patterns representative of the second signal.

16. A method according to claim 8, wherein a sentinel pattern is added to the end of the current active list so that the method can identify when all the active patterns, for the current first signal pattern, have been processed.

17. A method according to claim 16, wherein the cumulative value associated with the sentinel pattern is set to a predetermined value, and wherein the method identifies the sentinel pattern by comparing the cumulative value of each active pattern with said predetermined value.

18. A method according to claim 17, wherein said predetermined value is zero.

19. A method according to claim 16, wherein after the method has processed all the active patterns on the current active list, the method further comprises the step of adding the sentinel pattern to the end of the new active list.

20. A method according to claim 1, wherein one of said path propagation constraints is that if a second signal pattern is matched with a first signal pattern, then second signal patterns which are sequentially before that second signal pattern cannot be matched with the succeeding first signal pattern on the same path.

21. A method according to claim 1, wherein one of said path propagation constraints is that a penalty is added to the cumulative value associated with a path which is matched with the same second signal pattern for consecutive first signal patterns being processed.

22. A method according to claim 1, wherein the method only updates the cumulative value of the current active pattern and propagates the path associated with the current active pattern if the cumulative value associated therewith is better than a threshold value.

23. A method according to claim 22, wherein said threshold value is varied in order to try to maintain the number of active patterns processed for each first signal pattern to be below a given maximum number.

24. A method according to claim 23, wherein the threshold value used during the processing of the succeeding first signal pattern is determined during the processing of the current first signal pattern, and is dependent upon the total number of second signal patterns in the new active list for the succeeding first signal pattern to be processed.

25. A method according to claim 22, wherein a plurality of threshold values are used, and wherein the threshold value used for a given path depends upon the position, within the sequence of second signal patterns representing said second signal, of the second signal pattern which is at the end of the given path for the current first signal pattern being processed.

26. A method according to claim 25, wherein the threshold values used for paths ending towards the beginning of the sequence is larger than the thresholds used for paths ending towards the end of the sequence.

27. A method according to claim 22, wherein a soft pruning operation is performed, whereby some paths which have a cumulative value worse than the threshold are not discarded.

28. A method according to claim 1, wherein the processing of the current first signal pattern is preformed before the succeeding first signal pattern is received.

29. A method according to claim 1, wherein the whole first signal is received before the first signal pattern is processed.

30. A method according to claim 1, wherein said second signal patterns are representative of a template, and wherein said cumulative values are distance measures.

31. A method according to claim 1, wherein said second signal patterns are representative of a statistical model, and wherein said cumulative values are probabilistic measures.

32. A method according to claim 1, further comprising the step of comparing said first signal with a plurality of second signals.

33. A method according to claim 32, wherein said first signal can be matched with a sequence of said plurality of second signals, by allowing paths propagating in one second signal to subsequently propagate into another second signal.

34. A method according to claim 33, wherein the sequence of second signals against which the first signal can be matched is constrained by a set of predefined rules.

35. A method according to claim 33, wherein each of said patterns are represented by a plurality of parameter values and wherein said distance measure represents a sum of the magnitude of the difference between the corresponding parameter values of the current first signal pattern and the current active pattern.

36. A method according to claim 1, wherein said method utilises a dynamic programming matching process.

37. A method according to claim 1, wherein the cumulative value for a path is updated by adding a distance measure representative of the distance between the current first signal pattern and the current active pattern.

38. A method according to claim 37, wherein said distance measure is determined by using the following equation:

$$d(S, f_k) = \sum_{p=1}^{m} |S^p - f_k^p|$$

where $d(S, f_k)$ is the distance measure, $S^p$ is the $p^{th}$ parameter value of the current active pattern and $f_k^p$ is the $p^{th}$ parameter value of the current first signal pattern being processed.

39. A method according to claim 38, wherein a look up table is used in the determination of the distance measure which is to be added to the cumulative value of a path.

40. A method according to claim 39, wherein the respective parameter values of the current first signal pattern and the current active pattern address the look up table, and wherein the values stored in that location of the look up table corresponds to the difference between the two parameter values.

41. A method according to claim 39, wherein prior to processing the current first signal pattern, the method identifies a sub table of look up values using the parameter values of the current first signal pattern, and wherein the distance measure which is to be added to the cumulative value for a path is determined by addressing the sub table of look up values with the parameter values of the current active pattern.

42. A method according to claim 39, wherein the distance measure which is to be added to the cumulative value of the path is determined using the following equation:

$$d(S, f_k) = \sum_{p=1}^{m} TP^p[S^p]$$

where $TP^p$ is the address of the look up table which is dependent upon the $p^{th}$ parameter of the current first signal pattern and $S^p$ is the $p^{th}$ parameter value of the current active pattern.

43. A method according to claim 42, wherein $TP^p$ is determined once per first signal pattern to be processed.

44. A method according to claim 1, wherein said first and second signals are representative of speech, and wherein each pattern comprises a number of parameters representative of the acoustic properties of the speech during a corresponding time frame.

45. A speech recognition method for recognising an input speech signal by comparing it with a plurality of reference speech signals, the method comprising the steps of:

extracting a sequence of input patterns representative of said input speech signal;

storing sequences of reference patterns, each sequence being representative of a corresponding reference speech signal;

matching the sequence of input patterns with the reference speech signals, using a method according to claim 44; and providing a recognition result from the cumulative values determined by said matching step.

46. A method according to claim 45, wherein said recognition result is provided by determining which of the paths, which end at the last input pattern in the sequence of input patterns, has the best cumulative value.

47. A method of matching a first sequence of patterns representative of a first signal with a second sequence of patterns representative of a second signal, wherein the method processes each first signal pattern in-turn by:

defining as active patterns the second signal patterns which are at the end of a path for a current first signal pattern being processed, each path representing a possible matching between an ordered sequence of second signal patterns and an ordered sequence of first signal patterns ending at said current first signal pattern;

for each active pattern, storing a cumulative value which is indicative of the closeness of the match for the path which ends at that active pattern for said current first signal pattern; and updating said cumulative values and propagating said paths based on constraints which are placed on the path propagation, by processing each active pattern in reverse sequential order;

wherein each of said patterns is represented by a plurality of parameter values and wherein the cumulative value for a path is updated by adding a distance measure representative of the distance between the current first signal pattern and the current active pattern and wherein the respective parameter values of the current first signal pattern and the current active pattern address a look up table, and wherein the value stored in that location of the look up table corresponds to the difference between the two parameter values.

48. A method according to claim 47, wherein prior to processing the current first signal pattern, the method identifies a sub table of look up values using parameter values of the current first signal pattern, and wherein the distance measure which is to be added to the cumulative value for a path is determined by addressing the sub table of look up values with the parameter values of the current active pattern.

49. A method according to claim 47, wherein the distance measure which is to be added to the cumulative value of the path is determined using the following equation:

$$d(S, f_k) = \sum_{p=1}^{m} TP^p[S^p]$$

where $TP^p$ is the address of the look up table which is dependent upon the $p^{th}$ parameter of the current first signal pattern and $S^p$ is the $p^{th}$ parameter value of the current active pattern.

50. A method according to claim 49, wherein $TP^p$ is determined once per first signal pattern to be processed.

51. An apparatus for matching a first sequence of patterns representative of a first signal with a second sequence of patterns representative of a second signal, wherein the apparatus is operable to process each first signal pattern in-turn and comprises:
   definition circuitry for defining as active patterns the second signal patterns which are at the end of a path for a current first signal pattern being processed, each path representing a possible matching between an ordered sequence of second signal patterns and an ordered sequence of first signal patterns ending at said current first signal pattern;
   a memory for storing, for each active pattern, a cumulative value which is indicative of the closeness of the match for the path which ends at that active pattern for said current first signal pattern; and
   processing circuitry for processing each active pattern in reverse sequential order to update said cumulative values and to propagate said paths based on constraints which are placed on the path propagation, said processing circuitry comprising:
   (i) first circuitry for determining which of the second signal patterns the path ending at the current active pattern can propagate to for the succeeding first signal pattern to be processed, based upon said path propagation constraints;
   (ii) second circuitry for identifying how many of the second signal patterns determined by said first circuitry have previously been so determined during the processing of a previous active pattern for the current first signal pattern being processed; and
   (iii) third circuitry for propagating the path associated with the current active pattern in dependence upon how many of said second signal patterns are identified by said second circuitry.

52. An apparatus according to claim 51, wherein said third circuitry is operable to compare cumulative values for those second signal patterns identified by said second circuitry before propagating the path associated with the current active pattern to those second signal patterns and wherein said third circuitry is operable to propagate the path associated with the current active pattern to the second signal patterns which are not identified by said second circuitry without preforming a comparison of cumulative values.

53. An apparatus according to claim 52, wherein each second signal pattern has a store, D[S], associated therewith for storing the cumulative value of the best path which ends at that second signal pattern for the current first signal pattern being processed, and wherein said third circuitry is operable to compare the cumulative value stored in the current active pattern with the cumulative value stored in the store associated with at least one of the second signal patterns identified by said second circuitry.

54. An apparatus according to claim 53, wherein said third circuitry comprises circuitry for carrying out the steps of:
   (a) comparing D[S] with D[S+N+1−m];
   (b) if D[S] is better than D[S+N+1−m], then propagating the path ending at the current active pattern to the second signal pattern S+N+1−m by making D[S+N+1−m]=D[S], decrementing m and returning to step (a); and
   (c) if D[S] is worse than D[S+N+1−m], then not propagating the path ending at the current active pattern to the second signal pattern S+N−1−m or any second signal pattern sequentially beyond second signal pattern S+N+1−m;
   where S is the current active pattern being processed, N is the number of second signal patterns which are sequentially beyond the current active pattern to which the path ending at the current active pattern can propagate for the succeeding first signal pattern to be processed and m is a positive integer variable which is initially set at the number of second signal patterns identified by said third circuitry.

55. An apparatus according to claim 54, wherein said third circuitry is operable to perform said steps (a), (b) and (c) while m is greater than zero.

56. An apparatus according to claim 54, wherein m is less than N.

57. An apparatus according to claim 54, further comprising a memory for storing the minimum cumulative value of all paths being propagated, and wherein said processing circuitry is operable to compare D[S] with said minimum cumulative value and to make the minimum cumulative value equal to D[S] if D[S] is better than the minimum cumulative value, if the path associated with the current active pattern is propagated by said processing circuitry to the second signal pattern S+N by making D[S+N]=D[S].

58. An apparatus according to claim 51, comprising listing circuitry for listing said active patterns for the current first signal pattern in reverse sequential order in a current active list and for listing, if they are not already listed, the second signal patterns identified by said second circuitry in a new active list in reverse sequential order.

59. An apparatus according to claim 58, further comprising an identifier for identifying the second signal pattern which is the earliest in the sequence of second signal patterns which is listed in the new active list by said listing circuitry after said processing circuitry has processed the preceding active pattern, and wherein said second circuitry is operable to identify how many of the second signal patterns determined by said first circuitry have previously been so determined by determining a positional relationship between the current active pattern being processed and the second signal pattern which is identified by said identifier.

60. An apparatus according to claim 59, wherein said positional relationship is determined by testing for the different possibilities which the relationship can have.

61. An apparatus according to claim 60, wherein said second circuitry identifies said positional relationship by testing for the following situations:

(A) the identifier identifies a second signal pattern which sequentially immediately succeeds the current active pattern being processed;
(B) the identifier identifies a second signal pattern which is sequentially beyond second signal pattern S+N;
(C) the identifier identifies a second signal pattern S+i, for i=1 to N−1;
where S is the current active pattern being processed and N is the number of second signal patterns which are beyond the current active pattern to which the path ending at the current active pattern can propagate to for the succeeding first signal pattern.

62. An apparatus according to claim 61, wherein said second circuitry is operable to test for situation (A) first and only test for situation (B) if situation (A) is false.

63. An apparatus according to claim 62, wherein said second circuitry is operable to test for situation (C) only if situation (B) is false.

64. An apparatus according to claim 63, wherein said second circuitry is operable to test situation (C) for a current value of i and only test for situation (C) for i+1 if situation (C) for i is false.

65. An apparatus according to claim 59, wherein after the new active list has been updated by the processing of the current active pattern by the processing circuitry, said identifier is operable to identify the second signal pattern on the new active list which is the earliest in the sequence of patterns representative of the second signal.

66. An apparatus according to claim 58, wherein a sentinel pattern is added to the end of the current active list, and wherein said processing circuitry is operable to identify when all the active patterns, for the current first signal pattern, have been processed by detecting the sentinel pattern.

67. An apparatus according to claim 66, wherein a cumulative value associated with the sentinel pattern is set to a predetermined value, and wherein the processing circuitry detects the sentinel pattern by comparing the cumulative value of each active pattern with said predetermined value.

68. An apparatus according to claim 67, wherein said predetermined value is zero.

69. An apparatus according to claim 66, wherein after the processing circuitry has processed all the active patterns on the current active list, said listing circuitry is operable to add the sentinel pattern to the end of the new active list.

70. An apparatus according to claim 51, wherein one of said path propagation constraints is that if a second signal pattern is matched with a first signal pattern, then second signal patterns which are sequentially before that second signal pattern cannot be matched with the succeeding first signal pattern on the same path.

71. An apparatus according to claim 51, wherein one of said path propagation constraints is that a penalty is added to the cumulative value associated with a path which is matched with the same second signal pattern for consecutive first signal patterns being processed.

72. An apparatus according to claim 51, wherein said processing circuitry is operable to only update the cumulative value of the current active pattern and to propagate the path associated with the current active pattern if the cumulative value associated therewith is better than a threshold value.

73. An apparatus according to claim 72, comprising threshold varying circuitry for varying said threshold value in order to try to maintain the number of active patterns processed for each first signal pattern to be below a given maximum number.

74. An apparatus according to claim 73, wherein said threshold varying circuitry is operable to vary said threshold value so that the threshold value used during the processing of the succeeding first signal pattern by said apparatus is determined during the processing of the current first signal pattern, and is dependent upon the total number of second signal patterns in the new active list for the succeeding first signal pattern to be processed.

75. An apparatus according to claim 72, wherein said processing circuitry is operable to use a plurality of threshold values, and wherein the threshold value used for a given path depends upon the position, within the sequence of second signal patterns representing said second signal, of the second signal pattern which is at the end of the given path for the current first signal pattern being processed.

76. An apparatus according to claim 75, wherein the threshold values used for paths ending towards the beginning of the sequence are larger than the threshold values used for paths ending towards the end of the sequence.

77. An apparatus according to claim 72, wherein said processing circuitry is operable to perform a soft pruning operation, whereby some paths which have a cumulative value worse than the threshold are not discarded.

78. An apparatus according to claim 51, operable to process the current first signal pattern before the succeeding first signal pattern is received.

79. An apparatus according to claim 51, operable to receive the whole first signal before processing the first signal pattern.

80. An apparatus according to claim 51, wherein said second signal patterns are representative of a template, and wherein said cumulative values are distance measures.

81. An apparatus according to claim 51, wherein said second signal patterns are representative of a statistical model, and wherein said cumulative values are probabilistic measures.

82. An apparatus according to claim 51, further comprising comparison circuitry for comparing said first signal with a plurality of second signals.

83. An apparatus according to claim 82, operable to allow said first signal to be matched with a sequence of said plurality of second signals, by allowing paths propagating in one second signal to subsequently propagate into another second signal.

84. An apparatus according to claim 83, comprising a set of predefined rules for constraining the sequence of second signals against which the first signal can be matched.

85. An apparatus according to claim 83, wherein each of said patterns are represented by a plurality of parameter values and wherein said distance measure represents a sum of the magnitude of the difference between the corresponding parameter values of the current first signal pattern and the current active pattern.

86. An apparatus according to claim 51, employing a dynamic programming matching technique.

87. An apparatus according to claim 51, wherein said processing circuitry is operable to update the cumulative value for a path by adding a distance measure representative of the distance between the current first signal pattern and the current active pattern.

88. An apparatus according to claim 87, wherein said distance measure is determined from the following equation:

$$d(S, f_k) = \sum_{p=1}^{m} |S^p - f_k^p|$$

where $d(S,f_k)$ is the distance measure, $S^p$ is the $p^{th}$ parameter value of the current active pattern and $f_k^p$ is the $p^{th}$ parameter value of the current first signal pattern being processed.

89. An apparatus according to claim 88, comprising a look up table which is used in the determination of the distance measure which is to be added to the cumulative value of a path.

90. An apparatus according to claim 89, wherein the respective parameter values of the current first signal pattern and the current active pattern address the look up table, and wherein the values stored in that location of the look up table corresponds to the difference between the two parameter values.

91. An apparatus according to claim 89, wherein prior to processing the current first signal pattern, the apparatus is operable to identify a sub table of look up values using the parameter values of the current first signal pattern, and wherein the distance measure which is to be added to the cumulative value for a path is determined by addressing the sub table of look up values with the parameter values of the current active pattern.

92. An apparatus according to claim 39, wherein the distance measure which is to be added to the cumulative value of the path is determined from the following equation:

$$d(S, f_k) = \sum_{p=1}^{m} TP^p[S^p]$$

where $TP^p$ is the address of the look up table which is dependent upon the $p^{th}$ parameter of the current first signal pattern and $S^p$ is the $p^{th}$ parameter value of the current active pattern.

93. An apparatus according to claim 92, wherein $TP^p$ is determined once per first signal pattern to be processed.

94. An apparatus according to claim 51, wherein said first and second signals are representative of speech, and wherein each pattern comprises a number of parameters representative of the acoustic properties of the speech during a corresponding time frame.

95. A speech recognition apparatus for recognising an input speech signal by comparing it with a plurality of reference speech signals, the apparatus comprising:
- extracting circuitry for extracting a sequence of input patterns representative of said input speech signal;
- a memory for storing sequences of reference patterns, each sequence being representative of a corresponding reference speech signal;
- a pattern matcher for matching the sequence of input patterns with the reference speech signals, using an apparatus according to claim 94; and
- output circuitry for outputting a recognition result from the cumulative values determined by said pattern matcher.

96. An apparatus according to claim 95, wherein said recognition result is provided by determining which of the paths, which end at the last input pattern in the sequence of input patterns, has the best cumulative matcher.

97. An apparatus for matching a first sequence of patterns representative of a first signal with a second sequence of patterns representative of a second signal, wherein the apparatus is operable to process each first signal pattern in-turn and comprises:
- definition circuitry for defining as active patterns the second signal patterns which are at the end of a path for a current first signal pattern being processed, each path representing a possible matching between an ordered sequence of second signal patterns and an ordered sequence of first signal patterns ending at said current first signal pattern;
- a memory for storing, for each active pattern, a cumulative value which is indicative of the closeness of the match for the path which ends at that active pattern for said current first signal pattern; and
- processing circuitry for processing each active pattern in reverse sequential order to update said cumulative values and to propagate said paths based on constraints which are placed on the path propagation;
- wherein each of said patterns is represented by a plurality of parameter values and wherein the cumulative value for a path is updated by adding a distance measure representative of the distance between the current first signal pattern and the current active pattern and wherein the respective parameter values of the current first signal pattern and the current active pattern address a look up table, and wherein the value stored in that location of the look up table corresponds to the difference between the two parameter values.

98. An apparatus according to claim 97, wherein prior to processing the current first signal pattern, the apparatus is operable to identify a sub table of look up values using parameter values of the current first signal pattern, and wherein the distance measure which is to be added to the cumulative value for a path is determined by addressing the sub table of look up values with the parameter values of the current active pattern.

99. An apparatus according to claim 97, wherein the distance measure which is to be added to the cumulative value of the path is determined using the following equation:

$$d(S, f_k) = \sum_{p=1}^{m} TP^p[S^p]$$

where $TP^p$ is the address of the look up table which is dependent upon the $p^{th}$ parameter of the current first signal pattern and $S^p$ is the $p^{th}$ parameter value of the current active pattern.

100. An apparatus according to claim 99, wherein $TP^p$ is determined once per first signal pattern to be processed.

101. A computer readable medium storing computer executable process steps to perform a pattern matching method for matching a first sequence of patterns representative of a first signal with a second sequence of patterns representative of a second signal, the process steps comprising steps for processing each first signal pattern in-turn by:
- defining as active patterns the second signal patterns which are at the end of a path for a current first signal pattern being processed, each path representing a possible matching between an ordered sequence of second signal patterns and an ordered sequence of first signal patterns ending at said current first signal pattern;
- for each active pattern, storing a cumulative value which is indicative of the closeness of the match for the path which ends at that active pattern for said current first signal pattern; and updating said cumulative values and propagating said paths based on constraints which are placed on the path propagation, by processing each active pattern in reverse sequential order, by:

(i) determining which of the second signal patterns the path ending at the current active pattern can propagate to for the succeeding first signal pattern to be processed, based upon said path propagation constraints;

(ii) identifying how many of the second signal patterns determined in step (i) have previously been so determined during the processing of a previous active pattern for the current first signal pattern being processed; and (iii) propagating the path associated with the current active pattern in dependence upon how many of said second signal patterns are identified in said step (ii).

102. A computer readable medium according to claim 101, wherein said step (iii) performs a comparison step for those second signal patterns identified in step (ii) before propagating the path associated with the current active pattern to those second signal patterns and wherein said step (iii) propagates the path associated with the current active pattern to the second signal patterns which are not identified in said step (ii) without preforming a comparison step.

103. A computer readable medium according to claim 102, wherein each second signal pattern has a store, D[S], associated therewith for storing the cumulative value of the best path which ends at that second signal pattern for the current first signal pattern being processed, and wherein said comparison step compares the cumulative value stored in the current active pattern with the cumulative value stored in the store associated with at least one of the second signal patterns identified in said step (ii).

104. A computer readable medium according to claim 103, wherein said step (iii) comprises the steps of:

(a) comparing D[S] with D[S+N+1−m];

(b) if D[S] is better than D[S+N+1−m], then propagating the path ending at the current active pattern to the second signal pattern S+N+1−m by making D[S+N+1−m]=D[S], decrementing m and returning to step (a); and (c) if D[S] is worse than D[S+N+1−m], then not propagating the path ending at the current active pattern to the second signal pattern S+N−1−m or any second signal pattern sequentially beyond second signal pattern S+N+1−m;

where S is the current active pattern being processed, N is the number of second signal patterns which are sequentially beyond the current active pattern to which the path ending at the current active pattern can propagate for the succeeding first signal pattern to be processed and m is a positive integer variable which is initially set at the number of second signal patterns identified in said step (ii).

105. A computer readable medium according to claim 104, wherein said steps (a), (b) and (c) are performed while m is greater than zero.

106. A computer readable medium according to claim 104, wherein m is less than N.

107. A computer readable medium according to claim 104, further comprising the step of storing the minimum cumulative value of all paths being propagated and wherein if the path associated with the current active pattern is propagated to the second signal pattern S+N by making D[S+N]=D[S], then the method further comprises the steps of comparing D[S] with said minimum cumulative value and making the minimum cumulative value equal to D[S] if D[S] is better than the minimum cumulative value.

108. A computer readable medium according to claim 101, wherein said active patterns for the current first signal pattern are listed, in reverse sequential order, in a current active list, and wherein the second signal patterns identified in step (i) are listed, if they are not already listed, in a new active list in reverse sequential order.

109. A computer readable medium according to claim 108, further comprising the step of using an identifier to identify the second signal pattern which is the earliest in the sequence of second signal patterns which is listed in the new active list after processing the preceding active pattern, and wherein said step (ii) identifies how many of the second signal patterns determined in step (i) have previously been so determined by determining a positional relationship between the current active pattern being processed and the second signal pattern which is identified by said identifier.

110. A computer readable medium according to claim 109, wherein said positional relationship is determined by testing for the different possibilities which the relationship can have.

111. A computer readable medium according to claim 110, wherein the method identifies said positional relationship by testing for the following situations:

(A) the identifier identifies a second signal pattern which sequentially immediately succeeds the current active pattern being processed;

(B) the identifier identifies a second signal pattern which is sequentially beyond second signal pattern S+N;

(C) the identifier identifies a second signal pattern S+i, for i=1 to N−1;

where S is the current active pattern being processed and N is the number of second signal patterns which are beyond the current active pattern to which the path ending at the current active pattern can propagate to for the succeeding first signal pattern.

112. A computer readable medium according to claim 111, wherein the method tests for situation (A) first and only tests for situation (B) if situation (A) is false.

113. A computer readable medium according to claim 112, wherein the method tests for situation (C) only if situation (B) is false.

114. A computer readable medium according to claim 113, wherein the method test situation (C) for a current value of i and only tests for situation (C) for i+1 if situation (C) for i is false.

115. A computer readable medium according to claim 109, wherein after the new active list has been updated by the processing of the current active pattern, said identifier is set to identify the second signal pattern on the new active list which is the earliest in the sequence of patterns representative of the second signal.

116. A computer readable medium according to claim 108, wherein a sentinel pattern is added to the end of the current active list so that the method can identify when all the active patterns, for the current first signal pattern, have been processed.

117. A computer readable medium according to claim 116, wherein the cumulative value associated with the sentinel pattern is set to a predetermined value, and wherein the method identifies the sentinel pattern by comparing the cumulative value of each active pattern with said predetermined value.

118. A computer readable medium according to claim 117, wherein said predetermined value is zero.

119. A computer readable medium according to claim 116, wherein after the method has processed all the active patterns on the current active list, the method further comprises the step of adding the sentinel pattern to the end of the new active list.

120. A computer readable medium according to claim 101, wherein one of said path propagation constraints is that if a second signal pattern is matched with a first signal pattern, then second signal patterns which are sequentially before that second signal pattern cannot be matched with the succeeding first signal pattern on the same path.

121. A computer readable medium according to claim 101, wherein one of said path propagation constraints is that a penalty is added to the cumulative value associated with a path which is matched with the same second signal pattern for consecutive first signal patterns being processed.

122. A computer readable medium according to claim 101, wherein the method only updates the cumulative value of the current active pattern and propagates the path associated with the current active pattern if the cumulative value associated therewith is better than a threshold value.

123. A computer readable medium according to claim 122, wherein said threshold value is varied in order to try to maintain the number of active patterns processed for each first signal pattern to be below a given maximum number.

124. A computer readable medium according to claim 123, wherein the threshold value used during the processing of the succeeding first signal pattern is determined during the processing of the current first signal pattern, and is dependent upon the total number of second signal patterns in the new active list for the succeeding first signal pattern to be processed.

125. A computer readable medium according to claim 122, wherein a plurality of threshold values are used, and wherein the threshold value used for a given path depends upon the position, within the sequence of second signal patterns representing said second signal, of the second signal pattern which is at the end of the given path for the current first signal pattern being processed.

126. A computer readable medium according to claim 125, wherein the threshold values used for paths ending towards the beginning of the sequence is larger than the thresholds used for paths ending towards the end of the sequence.

127. A computer readable medium according to claim 122, wherein a soft pruning operation is performed, whereby some paths which have a cumulative value worse than the threshold are not discarded.

128. A computer readable medium according to claim 101, wherein the processing of the current first signal pattern is preformed before the succeeding first signal pattern is received.

129. A computer readable medium according to claim 101, wherein the whole first signal is received before the first signal pattern is processed.

130. A computer readable medium according to claim 101, wherein said second signal patterns are representative of a template, and wherein said cumulative values are distance measures.

131. A computer readable medium according to claim 101, wherein said second signal patterns are representative of a statistical model, and wherein said cumulative values are probabilistic measures.

132. A computer readable medium according to claim 101, further comprising the step of comparing said first signal with a plurality of second signals.

133. A computer readable medium according to claim 132, wherein said first signal can be matched with a sequence of said plurality of second signals, by allowing paths propagating in one second signal to subsequently propagate into another second signal.

134. A computer readable medium according to claim 133, wherein the sequence of second signals against which the first signal can be matched is constrained by a set of predefined rules.

135. A computer readable medium according to claim 133, wherein each of said patterns are represented by a plurality of parameter values and wherein said distance measure represents a sum of the magnitude of the difference between the corresponding parameter values of the current first signal pattern and the current active pattern.

136. A computer readable medium according to claim 101, wherein said method utilises a dynamic programming matching process.

137. A computer readable medium according to claim 101, wherein the cumulative value for a path is updated by adding a distance measure representative of the distance between the current first signal pattern and the current active pattern.

138. A computer readable medium according to claim 137, wherein said distance measure is determined by using the following equation:

$$d(S, f_k) = \sum_{p=1}^{m} |S^p - f_k^p|$$

where $d(S, f_k)$ is the distance measure, $S^p$ is the $p^{th}$ parameter value of the current active pattern and $f_k^p$ is the $p^{th}$ parameter value of the current first signal pattern being processed.

139. A computer readable medium according to claim 138, wherein a look up table is used in the determination of the distance measure which is to be added to the cumulative value of a path.

140. A computer readable medium according to claim 139, wherein the respective parameter values of the current first signal pattern and the current active pattern address the look up table, and wherein the values stored in that location of the look up table corresponds to the difference between the two parameter values.

141. A computer readable medium according to claim 139, wherein prior to processing the current first signal pattern, the method identifies a sub table of look up values using the parameter values of the current first signal pattern, and wherein the distance measure which is to be added to the cumulative value for a path is determined by addressing the sub table of look up values with the parameter values of the current active pattern.

142. A computer readable medium according to claim 139, wherein the distance measure which is to be added to the cumulative value of the path is determined using the following equation:

$$d(S, f_k) = \sum_{p=1}^{m} TP^p[S^p]$$

where $TP^p$ is the address of the look up table which is dependent upon the $p^{th}$ parameter of the current first signal pattern and $S^p$ is the $p^{th}$ parameter value of the current active pattern.

143. A computer readable medium according to claim 142, wherein $TP^p$ is determined once per first signal pattern to be processed.

144. A computer readable medium according to claim 101, wherein said first and second signals are representative of speech, and wherein each pattern comprises a number of parameters representative of the acoustic properties of the speech during a corresponding time frame.

145. A computer readable medium storing computer executable process steps to perform a speech recognition method for recognising an input speech signal by comparing it with a plurality of reference speech signals, the process steps comprising the steps of:

extracting a sequence of input patterns representative of said input speech signal;

storing sequences of reference patterns, each sequence being representative of a corresponding reference speech signal;

matching the sequence of input patterns with the reference speech signals, using the process steps of claims 144; and providing a recognition result from the cumulative values determined by said matching step.

146. A computer readable medium according to claim 145, wherein said recognition result is provided by determining which of the paths, which end at the last input pattern in the sequence of input patterns, has the best cumulative value.

147. A computer readable medium storing computer executable process steps to perform a pattern matching method for matching a first sequence of patterns representative of a first signal with a second sequence of patterns representative of a second signal, the process steps comprising steps for processing each first signal pattern in-turn by:

defining as active patterns the second signal patterns which are at the end of a path for a current first signal pattern being processed, each path representing a possible matching between an ordered sequence of second signal patterns and an ordered sequence of first signal patterns ending at said current first signal pattern;

for each active pattern, storing a cumulative value which is indicative of the closeness of the match for the path which ends at that active pattern for said current first signal pattern; and updating said cumulative values and propagating said paths based on constraints which are placed on the path propagation, by processing each active pattern in reverse sequential order;

wherein each of said patterns is represented by a plurality of parameter values and wherein the cumulative value for a path is updated by adding a distance measure representative of the distance between the current first signal pattern and the current active pattern and wherein the respective parameter values of the current first signal pattern and the current active pattern address a look up table, and wherein the value stored in that location of the look up table corresponds to the difference between the two parameter values.

148. A computer readable medium according to claim 147, wherein prior to processing the current first signal pattern, the method identifies a sub table of look up values using parameter values of the current first signal pattern, and wherein the distance measure which is to be added to the cumulative value for a path is determined by addressing the sub table of look up values with the parameter values of the current active pattern.

149. A computer readable medium according to claim 147, wherein the distance measure which is to be added to the cumulative value of the path is determined using the following equation:

$$d(S, f_k) = \sum_{p=1}^{m} TP^p[S^p]$$

where $TP^p$ is the address of the look up table which is dependent upon the $p^{th}$ parameter of the current first signal pattern and $S^p$ is the $p^{th}$ parameter value of the current active pattern.

150. A computer readable medium according to claim 149, wherein $TP^p$ is determined once per first signal pattern to be processed.

151. A signal for conveying computer executable process steps to perform a pattern matching method for matching a first sequence of patterns representative of a first signal with a second sequence of patterns representative of a second signal, the process steps comprising steps for processing each first signal pattern in-turn by:

defining as active patterns the second signal patterns which are at the end of a path for a current first signal pattern being processed, each path representing a possible matching between an ordered sequence of second signal patterns and an ordered sequence of first signal patterns ending at said current first signal pattern;

for each active pattern, storing a cumulative value which is indicative of the closeness of the match for the path which ends at that active pattern for said current first signal pattern; and updating said cumulative values and propagating said paths based on constraints which are placed on the path propagation, by processing each active pattern in reverse sequential order, by:

(i) determining which of the second signal patterns the path ending at the current active pattern can propagate to for the succeeding first signal pattern to be processed, based upon said path propagation constraints;

(ii) identifying how many of the second signal patterns determined in step (i) have previously been so determined during the processing of a previous active pattern for the current first signal pattern being processed; and (iii) propagating the path associated with the current active pattern in dependence upon how many of said second signal patterns are identified in said step (ii).

152. A signal conveying computer executable process steps to perform a speech recognition method for recognising an input speech signal by comparing it with a plurality of reference speech signals, the process steps comprising the steps of:

extracting a sequence of input patterns representative of said input speech signal;

storing sequences of reference patterns, each sequence being representative of a corresponding reference speech signal;

matching the sequence of input patterns with the reference speech signals, using the process steps according to claim 151; and providing a recognition result from the cumulative values determined by said matching step.

153. A signal conveying computer executable process steps to perform a method of matching a first sequence of patterns representative of a first signal with a second sequence of patterns representative of a second signal, the process steps comprising steps for processing each first signal pattern in-turn by:

defining as active patterns the second signal patterns which are at the end of a path for a current first signal pattern being processed, each path representing a possible matching between an ordered sequence of second signal patterns and an ordered sequence of first signal patterns ending at said current first signal pattern;

for each active pattern, storing a cumulative value which is indicative of the closeness of the match for the path which ends at that active pattern for said current first signal pattern; and updating said cumulative values and propagating said paths based on constraints which are placed on the path propagation, by processing each active pattern in reverse sequential order;

wherein each of said patterns is represented by a plurality of parameter values and wherein the cumulative value for a path is updated by adding a distance measure representative of the distance between the current first signal pattern and the current active pattern and wherein the respective parameter values of the current first signal pattern and the current active pattern address a look up table, and wherein the value stored in that location of the look up table corresponds to the difference between the two parameter values.

* * * * *

UNITED STATES PATENT AND TRADEMARK OFFICE
CERTIFICATE OF CORRECTION

PATENT NO. : 6,226,610 B1
DATED : May 1, 2001
INVENTOR(S) : Robert Alexander Keiller et al.

It is certified that error appears in the above-identified patent and that said Letters Patent is hereby corrected as shown below:

Column 1,
Line 7, "FILED" should read -- FIELD --.

Column 7,
Line 17, "(j-1, j-3)," should read -- (k-1, j-3), --; and
Line 41, "D(k,j) = d(k,j) = min" should read -- D(k,j) = d(k,j) + min --.

Column 13,
Line 13, "$S^P$-Fp$^p_k$" should read -- $S^p$-F$^p_k$ --.

Column 16,
Line 5, "upto" should read -- up to --.

Column 17,
Line 44, "i.e." should read -- i.e., --; and
Line 55, "it" should be deleted.

Column 18,
Line 3, "i.e." should read -- i.e., --.

Column 19,
Line 27, "there" (first occurrence) should read -- the --.

Column 24,
Line 29, the right margin should be closed up.

Column 25,
Line 4, "e.g." should read -- e.g., --.

Column 26,
Line 2, "package" should read -- package, --;
Line 65, "preforming" should read -- performing --; and
Line 67, "D[ ]," should read -- D[S], --.

Column 29,
Line 40, "utilises" should read -- utilizes --;
Line 52, "d(S,f$_k$)" should read -- d(S,f$_k$) --; and
Line 63, "corresponds" should read -- correspond --.

UNITED STATES PATENT AND TRADEMARK OFFICE
CERTIFICATE OF CORRECTION

PATENT NO.     : 6,226,610 B1
DATED          : May 1, 2001
INVENTOR(S)    : Robert Alexander Keiller et al.

It is certified that error appears in the above-identified patent and that said Letters Patent is hereby corrected as shown below:

Column 32,
Line 2, "preforming" should read -- performing --.

Column 35,
Line 6, "$d(S,f_{,k})$" should read -- $d(S,f_k)$ --;
Line 18, "corresponds" should read -- correspond --; and
Line 47, "recognising" should read -- recognizing --.

Column 39,
Line 49, "preformed" should read -- performed --.

Column 40,
Line 14, "utilises" should read -- utilizes --;
Line 29, "$d(S,f_{,k})$" should read -- $d(S,f_k)$ --;  and
Line 41, "corresponds" should read -- corresond --.

Column 41,
Line 8, "recognising" should read -- recognizing --.

Column 42,
Line 49, "recognis-" should read -- recogniz- --.

Signed and Sealed this

Tenth Day of December, 2002

JAMES E. ROGAN
*Director of the United States Patent and Trademark Office*